United States Patent
Chen

(10) Patent No.: US 7,146,042 B2
(45) Date of Patent: Dec. 5, 2006

(54) IMAGE PROCESSING APPARATUS AND COLORIMETRIC SYSTEM CONVERSION METHOD

(75) Inventor: Zhe-Hong Chen, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 755 days.

(21) Appl. No.: 10/363,685

(22) PCT Filed: Sep. 7, 2001

(86) PCT No.: PCT/JP01/07802

§ 371 (c)(1),
(2), (4) Date: Mar. 7, 2003

(87) PCT Pub. No.: WO02/21849

PCT Pub. Date: Mar. 14, 2002

(65) Prior Publication Data
US 2003/0164886 A1 Sep. 4, 2003

(30) Foreign Application Priority Data
Sep. 7, 2000 (JP) .............................. 2000-271471

(51) Int. Cl.
*G06K 9/00* (2006.01)
(52) U.S. Cl. .................... 382/167; 382/272; 382/274; 382/275; 382/260; 348/222.1; 348/223.1
(58) Field of Classification Search ................ 382/272, 382/270, 274, 275, 254, 260, 266, 269, 162, 382/167; 348/222.1, 223.1
See application file for complete search history.

(56) References Cited

U.S. PATENT DOCUMENTS

| 5,373,322 A | 12/1994 | Laroche et al. |
| 5,506,619 A | 4/1996 | Adams, Jr. et al. |
| 5,901,242 A | 5/1999 | Crane et al. |
| 6,075,889 A | 6/2000 | Hamilton, Jr. et al. |
| 6,392,699 B1 | 5/2002 | Acharya |
| 6,628,327 B1 | 9/2003 | Aoki et al. |
| 7,016,549 B1* | 3/2006 | Utagawa ..................... 382/261 |
| 2004/0013310 A1* | 1/2004 | Suino et al. ................ 382/240 |

FOREIGN PATENT DOCUMENTS

| JP | A 10-294948 | 11/1998 |
| JP | A 11-177994 | 7/1999 |

(Continued)

*Primary Examiner*—Jingge Wu
*Assistant Examiner*—Ali Bayat
(74) *Attorney, Agent, or Firm*—Oliff & Berridge PLC

(57) ABSTRACT

The first image processing apparatus that converts a first image having a plurality of pixels and expressed in a first calorimetric system constituted of a plurality of color components with each of the pixels corresponding to one of the color components to a second image expressed in a second calorimetric system constituted of a plurality of color components which are different from the first calorimetric system, comprises: a similarity decision-making device that determines levels of similarity manifesting at a processing object pixel in the first image along a plurality of directions; and a new component generating device that generates color information representing at least one of the color components constituting the second calorimetric system at a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity by the similarity decision-making device.

37 Claims, 12 Drawing Sheets

FOREIGN PATENT DOCUMENTS

| JP | A 2000-197067 | 7/2000 |
| JP | A 2000-341701 | 12/2000 |
| JP | A 2001-45505 | 2/2001 |
| WO | WO99/59345 | 11/1999 |

* cited by examiner

FIG.2

| COORDI-NATES [i,j] | i-2 | i-1 | i | i+1 | i+2 |
|---|---|---|---|---|---|
| j-2 | R | G | R | G | R |
| j-1 | G | B | G | B | G |
| j | R | G | R | G | R |
| j+1 | G | B | G | B | G |
| j+2 | R | G | R | G | R |

(1) R-POSITIONED STATE

| COORDI-NATES [i,j] | i-2 | i-1 | i | i+1 | i+2 |
|---|---|---|---|---|---|
| j-2 | B | G | B | G | B |
| j-1 | G | R | G | R | G |
| j | B | G | B | G | B |
| j+1 | G | R | G | R | G |
| j+2 | B | G | B | G | B |

(2) B-POSITIONED STATE

| COORDI-NATES [i,j] | i-2 | i-1 | i | i+1 | i+2 |
|---|---|---|---|---|---|
| j-2 | G | R | G | R | G |
| j-1 | B | G | B | G | B |
| j | G | R | G | R | G |
| j+1 | B | G | B | G | B |
| j+2 | G | R | G | R | G |

(3) Gr-POSITIONED STATE

| COORDI-NATES [i,j] | i-2 | i-1 | i | i+1 | i+2 |
|---|---|---|---|---|---|
| j-2 | G | B | G | B | G |
| j-1 | R | G | R | G | R |
| j | G | B | G | B | G |
| j+1 | R | G | R | G | R |
| j+2 | G | B | G | B | G |

(4) Gb-POSITIONED STATE

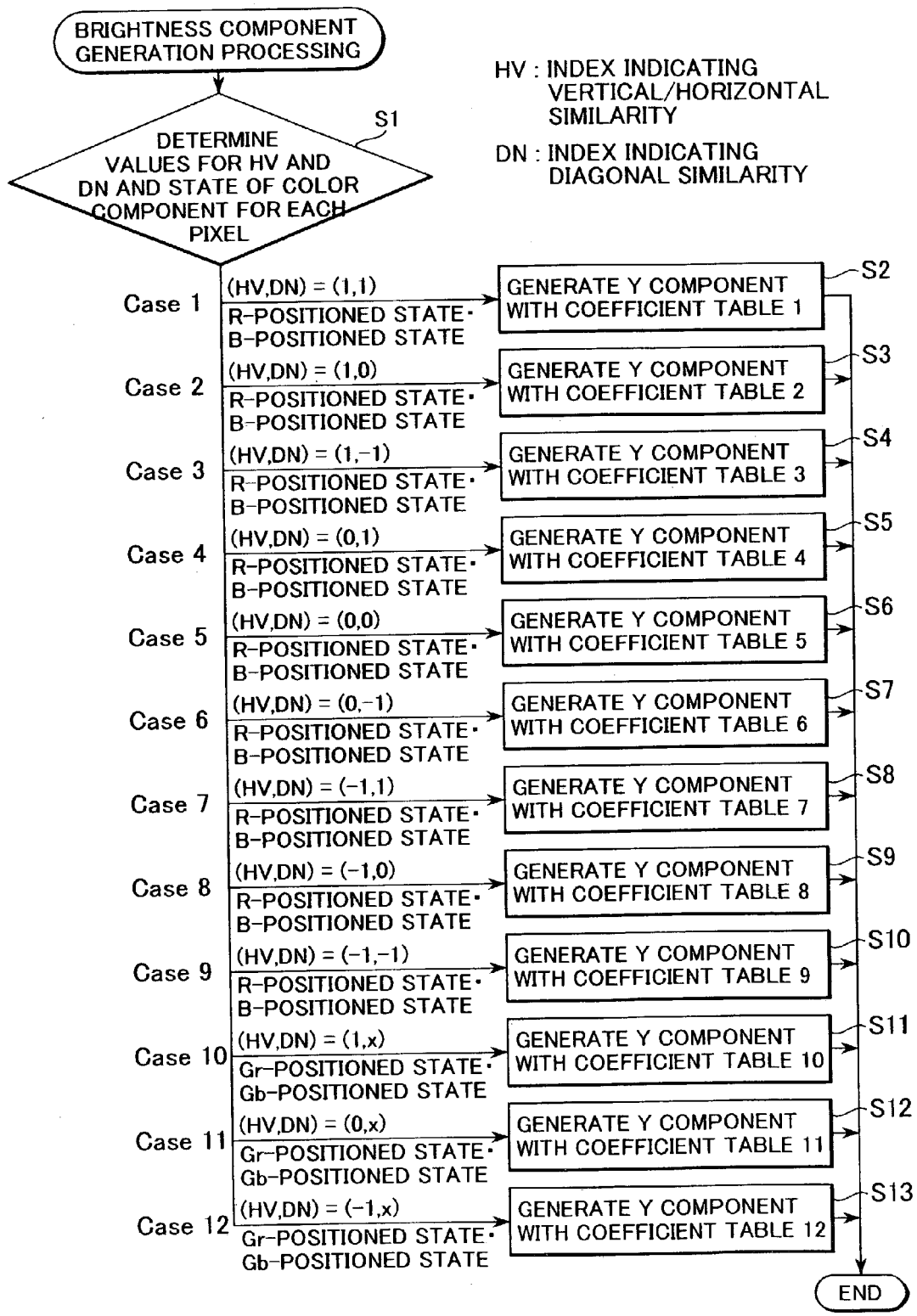

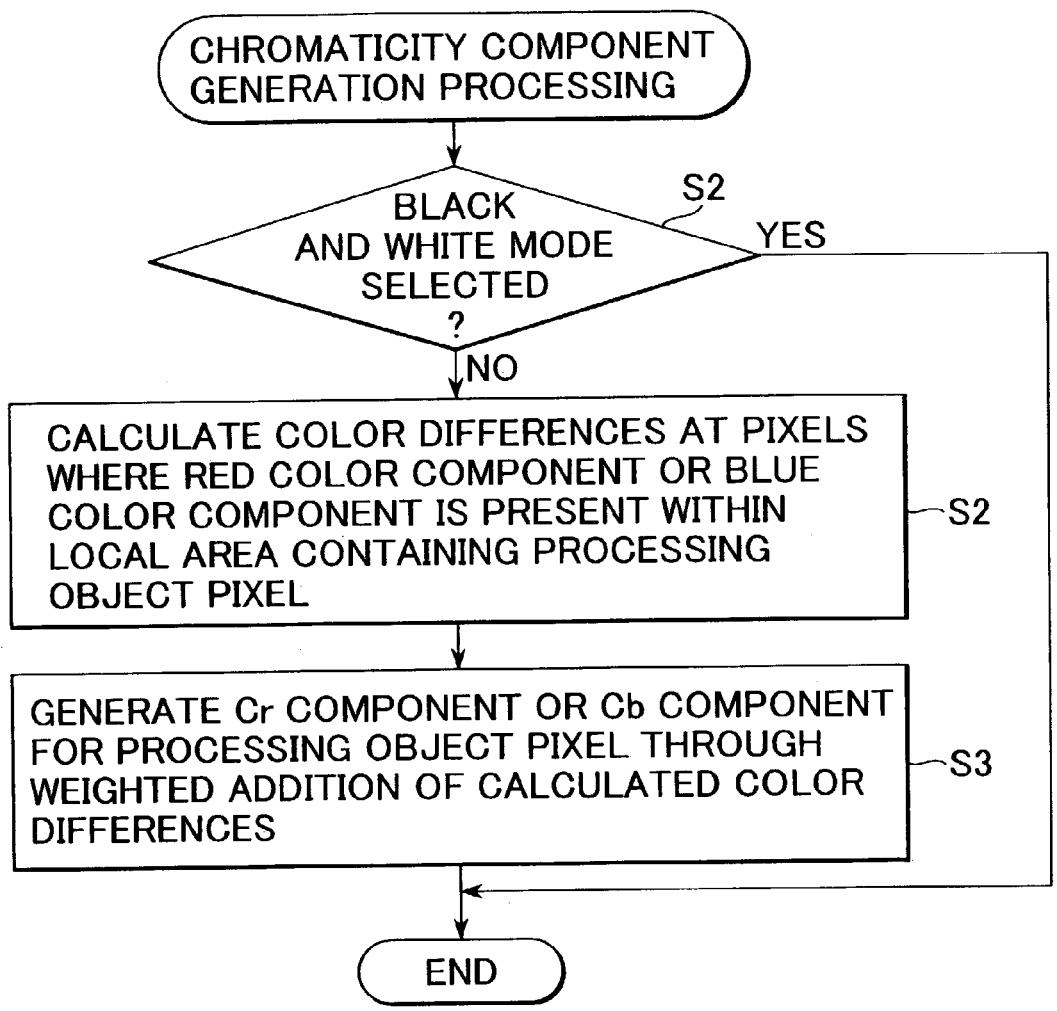
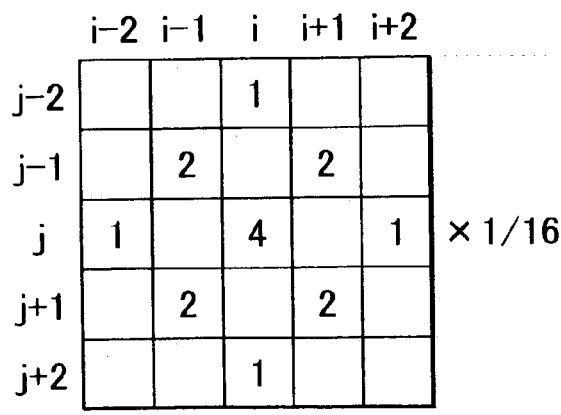

FIG.10

|   | i-2 | i-1 | i | i+1 | i+2 |
|---|---|---|---|---|---|
| j-2 | 0 | 0 | -1 | -1 | 0 |
| j-1 | 0 | -1 | 6 | 3 | 0 |
| j | 0 | -1 | 6 | -1 | 0 |
| j+1 | 0 | 3 | 6 | -1 | 0 |
| j+2 | 0 | -1 | -1 | 0 | 0 |

× 1/16

(1) COEFFICIENT TABLE 1

|   | i-2 | i-1 | i | i+1 | i+2 |
|---|---|---|---|---|---|
| j-2 | 0 | -5 | -4 | -5 | 0 |
| j-1 | 0 | 4 | 24 | 4 | 0 |
| j | 0 | 2 | 24 | 2 | 0 |
| j+1 | 0 | 4 | 24 | 4 | 0 |
| j+2 | 0 | -5 | -4 | -5 | 0 |

× 1/64

(2) COEFFICIENT TABLE 2

|   | i-2 | i-1 | i | i+1 | i+2 |
|---|---|---|---|---|---|
| j-2 | 0 | -1 | -1 | 0 | 0 |
| j-1 | 0 | 3 | 6 | -1 | 0 |
| j | 0 | -1 | 6 | -1 | 0 |
| j+1 | 0 | -1 | 6 | 3 | 0 |
| j+2 | 0 | 0 | -1 | -1 | 0 |

× 1/16

(3) COEFFICIENT TABLE 3

|   | i-2 | i-1 | i | i+1 | i+2 |
|---|---|---|---|---|---|
| j-2 | 0 | 0 | -1 | -1 | 0 |
| j-1 | 0 | -2 | 5 | 6 | -1 |
| j | -1 | 5 | 12 | 5 | -1 |
| j+1 | -1 | 6 | 5 | -2 | 0 |
| j+2 | 0 | -1 | -1 | 0 | 0 |

× 1/32

(4) COEFFICIENT TABLE 4

|   | i-2 | i-1 | i | i+1 | i+2 |
|---|---|---|---|---|---|
| j-2 | 0 | -5 | -6 | -5 | 0 |
| j-1 | -5 | 8 | 26 | 8 | -5 |
| j | -6 | 26 | 56 | 26 | -6 |
| j+1 | -5 | 8 | 26 | 8 | -5 |
| j+2 | 0 | -5 | -6 | -5 | 0 |

× 1/128

(5) COEFFICIENT TABLE 5

|   | i-2 | i-1 | i | i+1 | i+2 |
|---|---|---|---|---|---|
| j-2 | 0 | -1 | -1 | 0 | 0 |
| j-1 | -1 | 6 | 5 | -2 | 0 |
| j | -1 | 5 | 12 | 5 | -1 |
| j+1 | 0 | -2 | 5 | 6 | -1 |
| j+2 | 0 | 0 | -1 | -1 | 0 |

× 1/32

(6) COEFFICIENT TABLE 6

FIG.11

(7) COEFFICIENT TABLE 7

|  | i−2 | i−1 | i | i+1 | i+2 |
|---|---|---|---|---|---|
| j−2 | 0 | 0 | 0 | 0 | 0 |
| j−1 | 0 | −1 | −1 | 3 | −1 |
| j | −1 | 6 | 6 | 6 | −1 |
| j+1 | −1 | 3 | −1 | −1 | 0 |
| j+2 | 0 | 0 | 0 | 0 | 0 |

× 1/16

(8) COEFFICIENT TABLE 8

|  | i−2 | i−1 | i | i+1 | i+2 |
|---|---|---|---|---|---|
| j−2 | 0 | 0 | 0 | 0 | 0 |
| j−1 | −5 | 4 | 2 | 4 | −5 |
| j | −4 | 24 | 24 | 24 | −4 |
| j+1 | −5 | 4 | 2 | 4 | −5 |
| j+2 | 0 | 0 | 0 | 0 | 0 |

× 1/64

(9) COEFFICIENT TABLE 9

|  | i−2 | i−1 | i | i+1 | i+2 |
|---|---|---|---|---|---|
| j−2 | 0 | 0 | 0 | 0 | 0 |
| j−1 | −1 | 3 | −1 | −1 | 0 |
| j | −1 | 6 | 6 | 6 | −1 |
| j+1 | 0 | −1 | −1 | 3 | −1 |
| j+2 | 0 | 0 | 0 | 0 | 0 |

× 1/16

(10) COEFFICIENT TABLE 10

|  | i−2 | i−1 | i | i+1 | i+2 |
|---|---|---|---|---|---|
| j−2 | 0 | 1 | −2 | 1 | 0 |
| j−1 | 0 | −4 | 8 | −4 | 0 |
| j | 0 | 6 | 52 | 6 | 0 |
| j+1 | 0 | −4 | 8 | −4 | 0 |
| j+2 | 0 | 1 | −2 | 1 | 0 |

× 1/64

(11) COEFFICIENT TABLE 11

|  | i−2 | i−1 | i | i+1 | i+2 |
|---|---|---|---|---|---|
| j−2 | 0 | 1 | −4 | 1 | 0 |
| j−1 | 1 | −4 | 14 | −4 | 1 |
| j | −4 | 14 | 96 | 14 | −4 |
| j+1 | 1 | −4 | 14 | −4 | 1 |
| j+2 | 0 | 1 | −4 | 1 | 0 |

× 1/128

(12) COEFFICIENT TABLE 12

|  | i−2 | i−1 | i | i+1 | i+2 |
|---|---|---|---|---|---|
| j−2 | 0 | 0 | 0 | 0 | 0 |
| j−1 | 1 | −4 | 6 | −4 | 1 |
| j | −2 | 8 | 52 | 8 | −2 |
| j+1 | 1 | −4 | 6 | −4 | 1 |
| j+2 | 0 | 0 | 0 | 0 | 0 |

|     | i-2 | i-1 | i | i+1 | i+2 |
|-----|-----|-----|-----|-----|-----|
| j-2 | Cr  |     | Cr  |     | Cr  |
| j-1 |     |     |     |     |     |
| j   | Cr  |     | Cr  |     | Cr  |
| j+1 |     |     |     |     |     |
| j+2 | Cr  |     | Cr  |     | Cr  |

(1) R-POSITIONED STATE

|     | i-2 | i-1 | i | i+1 | i+2 |
|-----|-----|-----|-----|-----|-----|
| j-2 |     |     |     |     |     |
| j-1 |     | Cr  |     | Cr  |     |
| j   |     |     |     |     |     |
| j+1 |     | Cr  |     | Cr  |     |
| j+2 |     |     |     |     |     |

(2) B-POSITIONED STATE

|     | i-2 | i-1 | i | i+1 | i+2 |
|-----|-----|-----|-----|-----|-----|
| j-2 |     | Cr  |     | Cr  |     |
| j-1 |     |     |     |     |     |
| j   |     |     | Cr  |     | Cr  |
| j+1 |     |     |     |     |     |
| j+2 |     | Cr  |     | Cr  |     |

(3) Gr-POSITIONED STATE

|     | i-2 | i-1 | i | i+1 | i+2 |
|-----|-----|-----|-----|-----|-----|
| j-2 |     |     |     |     |     |
| j-1 | Cr  |     | Cr  |     | Cr  |
| j   |     |     |     |     |     |
| j+1 | Cr  |     | Cr  |     | Cr  |
| j+2 |     |     |     |     |     |

(4) Gb-POSITIONED STATE

FIG.13

|     | i-2 | i-1 | i | i+1 | i+2 |
|-----|-----|-----|-----|-----|-----|
| j-2 | 0   | 0   | 1   | 1   | 0   |
| j-1 | 0   | 2   | -5  | -6  | 1   |
| j   | 1   | -5  | 20  | -5  | 1   |
| j+1 | 1   | -6  | -5  | 2   | 0   |
| j+2 | 0   | 1   | 1   | 0   | 0   |

Case 1

| 0 | 2 | 1 |
|---|---|---|
| 0 | 2 | 0 |
| 1 | 2 | 0 |

× 1/8

(1)

Case 2

| 1 | 4 | 1 |
|---|---|---|
| 0 | 4 | 0 |
| 1 | 4 | 1 |

× 1/16

(2)

Case 3

| 1 | 2 | 0 |
|---|---|---|
| 0 | 2 | 0 |
| 0 | 2 | 1 |

× 1/8

(3)

Case 4

| 0 | 1 | 1 |
|---|---|---|
| 1 | 2 | 1 |
| 1 | 1 | 0 |

× 1/8

(4)

Case 5

| 1 | 2 | 1 |
|---|---|---|
| 2 | 4 | 2 |
| 1 | 2 | 1 |

× 1/16

(5)

Case 6

| 1 | 1 | 0 |
|---|---|---|
| 1 | 2 | 1 |
| 0 | 1 | 1 |

× 1/8

(6)

Case 7

| 0 | 0 | 1 |
|---|---|---|
| 2 | 2 | 2 |
| 1 | 0 | 0 |

× 1/8

(7)

Case 8

| 1 | 0 | 1 |
|---|---|---|
| 4 | 4 | 4 |
| 1 | 0 | 1 |

× 1/16

(8)

Case 9

| 1 | 0 | 0 |
|---|---|---|
| 2 | 2 | 2 |
| 0 | 0 | 1 |

× 1/8

(9)

Case 10~12

| 0 | 1 | 0 |
|---|---|---|
| 1 | 4 | 1 |
| 0 | 1 | 0 |

| −1 | −1 | −1 |
|---|---|---|
| −1 | 16 | −1 |
| −1 | −1 | −1 |

× 1/8

IMAGE PROCESSING APPARATUS AND COLORIMETRIC SYSTEM CONVERSION METHOD

INCORPORATION BY REFERENCE

The disclosure of the following priority application is herein incorporated by reference: Japanese Patent Application No. 2000-271471 filed Sep. 7, 2000

TECHNICAL FIELD

The present invention relates to an image processing apparatus that implements calorimetric system conversion processing on a polychromatic image presented in a first calorimetric system constituted of a plurality of color components with a given color component made to correspond to a single pixel in order to generate color information indicating at least one color component constituting a second calorimetric system different from the first calorimetric system in units of individual pixels and also relates to a method adopted in the calorimetric system conversion processing.

BACKGROUND ART

There are electronic cameras that generate image data at an image-capturing element having color filters that represent a plurality of colors and are provided at predetermined positions and implement image processing such as noise removal, edge emphasis and color conversion on the image data.

In such an electronic camera, the color components assigned to the individual color filters (e.g., CMYG: cyan, magenta, yellow and green, or RGB: red, green and blue) at the image-capturing element determine the calorimetric system used on the image data input side. However, the calorimetric system of the image data generated at the image-capturing element undergoes calorimetric system conversion processing to be converted to the YCrCb calorimetric system constituted of a brightness (or luminance) component Y and color components Cr and Cb which better suits the characteristics of the human visual system, so as to achieve better efficiency in the image processing including the noise removal and the edge emphasis and to enable standardized image compression such as JPEG.

This calorimetric system conversion processing may be realized by generating a Y component a Cr component and a Cb component for each of the pixels constituting the image data.

For instance, when generating these components directly from the image data generated at the image-capturing element, the Y component is generated by adding the color information at pixels present in the vicinity of a "processing object pixel (pixel to be processed)" undergoing the calorimetric system conversion processing and the Cr component and the Cb component for the processing object pixel are generated based upon differences among the color information at nearby pixels in an electronic camera in the related art.

However, since a plurality of sets of color information corresponding to the pixels present within a predetermined range which contains the processing object pixel are simply added together to generate the Y component, the color information at these pixels becomes averaged to result in a loss of the high-frequency component in the image data obtained at the image-capturing element in the electronic camera. Consequently, the image in the YCrCb calorimetric system obtained through the calorimetric system conversion processing becomes blurred.

It is to be noted that there are electronic cameras provided with an image-capturing element having R, G and B color filters arrayed in a Bayer array, which implement interpolation processing in order to obtain color information corresponding to all the color components, i.e., R, G and B, for each pixel and generate the Y component, the Cr component and the Cb component by using the color information obtained through the interpolation processing. However, since the interpolation processing is implemented for all the color components in the calorimetric system at the image-capturing element without fail during the calorimetric system conversion process, the efficiency of these electronic cameras is poor.

DISCLOSURE OF THE INVENTION

An object of the present invention is to provide an image processing apparatus and a calorimetric system conversion method that may be adopted to achieve efficient calorimetric system conversion processing while improving the resolution.

The first image processing apparatus according to the present invention that converts a first image having a plurality of pixels and expressed in a first calorimetric system constituted of a plurality of color components with each of the pixels corresponding to one of the color components to a second image expressed in a second calorimetric system constituted of a plurality of color components which are different from the first calorimetric system, comprises: a similarity decision-making device that determines levels of similarity manifesting at a processing object pixel in the first image along a plurality of directions; and a new component generating device that generates color information representing at least one of the color components constituting the second calorimetric system at a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity by the similarity decision-making device.

In this first image processing apparatus, it is preferred that the predetermined coefficients are set so as to achieve a constant ratio of sums of coefficients each sum corresponding to one of the plurality of color components constituting the first calorimetric system.

Also, in the first image processing, it is preferred that an emphasizing device that emphasizes a high spatial frequency components in the color information in the second image generated by the new component generating device, is further provided.

Also, in the first image processing apparatus, it is preferred that the predetermined coefficients corresponding to the plurality of directions along which the levels of similarity are determined correspond to each of coefficient patterns and coefficient value ratios shown in FIG. 14.

Also, in the first image processing apparatus, it is preferred that the plurality of sets of color information that are selected include color information corresponding to all the color components constituting the first calorimetric system present at, at least, one pixel corresponding to each of the color components.

The second image processing apparatus according to the present invention that converts a first image having a plurality of pixels and expressed in a first calorimetric system constituted of a plurality of color components with each of the pixels corresponding to one of the color components to a second image expressed in a second calorimetric system constituted of a plurality of color components which are different from the first calorimetric system, comprises: a new component generating device that generates color information representing at least one of the color components constituting the second colorimetric system for a pixel in the second image corresponding to a processing object pixel in the first image by assigning a positive weighting coefficient to color information present in a central area containing the processing object pixel and at least one pixel adjacent to the processing object pixel in the first image, assigning a negative weighting coefficient to color information present in an area containing at least one pixel adjacent to the central area and executing a weighted addition of the plurality of sets of color information.

It is preferred that the second image processing apparatus further comprises: a similarity decision-making device that determines levels of similarity manifesting at the processing object pixel along a plurality of directions, and: the new component generating device selects an area ranging along a direction in which pronounced similarity manifests around the processing object pixel as the central area, based upon results of a decision made with regard to the levels of similarity by the similarity decision-making device. In this case, it is preferred that the weighting coefficients correspond to the plurality of directions along which the levels of similarity are determined correspond to each of coefficient patterns and coefficient value ratios shown in FIGS. 10 and 11.

Also, it is preferred that the second image processing apparatus further comprises: a similarity decision-making device that determines levels of similarity manifesting at the processing object pixel along a plurality of directions, and: the new component generating device varies a value set for the weighting coefficient for the color information present in the central area in conformance to results of a decision made with regard to the levels of similarity by the similarity decision-making device.

Also, in the second image processing apparatus, it is preferred that the color information in the central area includes color information corresponding to all the color components constituting the first calorimetric system present at, at least, one pixel corresponding to each of the color components.

It is preferred that the above first image processing apparatus further comprises: a coefficient storage device that stores a plurality of coefficient sets of the predetermined coefficients corresponding to the plurality of directions in which the levels of similarity are determined. In this case, it is preferred that: the coefficient storage device stores a plurality of types of coefficient sets each in correspondence to a specific direction along which pronounced similarity manifests at the processing object pixel and also in correspondence to a color component at the processing object pixel; and the new color component generating device selects a coefficient set corresponding to the results of the decision made with regard to the levels of similarity by the similarity decision-making device and the color component at the processing object pixel from the coefficient storage device. Also, it is preferred that the coefficient storage device stores the coefficient sets as coefficient tables. Also, it is preferred that: the coefficient storage device stores the coefficient sets as computational expressions; and the new color component generating device executes the weighted addition with the predetermined coefficients by using a computing expression selected in conformance to the results of the decision made with regard to the levels of similarity by the similarity decision-making device.

In the above image processing apparatuses, it is preferred that the second calorimetric system comprises a brightness component and a chromaticity component. In this case, it is preferred that the first calorimetric system is an RGB colorimetric system. Or it is preferred that the first calorimetric system is a CMYG calorimetric system.

Also, in the first or second image processing apparatus, it is preferred that the similarity decision-making device calculates similarity degrees for the processing object pixel along a plurality of directions by calculating "same color similarity degrees each incorporating a plurality of similarity components each having sets of color information corresponding to a single color component" among the plurality of color components constituting the first calorimetric system and "different color similarity degrees each incorporating a plurality of similarity degree components each constituted of sets of color information corresponding to different color components" among the plurality of color components constituting the first calorimetric system and by selecting either the same color similarity degrees or the different color similarity degrees or switching weighting ratios used when performing a weighted addition of the individual similarity degrees in conformance to characteristics of an image over a local area containing the processing object pixel, and determines the levels of similarity manifesting at the processing object pixel along the plurality of directions based upon the similarity degrees. In this case, it is preferred that the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

Also, in the first or second image processing apparatus, it is preferred that the similarity decision-making device calculates similarity degrees for the processing object pixel along a plurality of directions by using color information representing all the color components constituting the first colorimetric system and determines the levels of similarity manifesting at the processing object pixel along the plurality of directions based upon the similarity degrees. In this case, also, it is preferred that the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

A calorimetric system conversion method according to the present invention for converting a first image having a plurality of pixels and expressed in a first calorimetric system constituted of a plurality of color components with each of the pixels corresponding to one of the color components to a second image expressed in a second calorimetric system constituted of a plurality of color components which are different from the first calorimetric system, comprises: determining levels of similarity manifesting at a processing object pixel along a plurality of directions in the first image; and generating color information representing at least one of the color components constituting the second calorimetric system for a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity.

In this calorimetric system conversion method, it is preferred that the predetermined coefficients are set so as to achieve a constant ratio of sums of coefficients each sum corresponding to one of the plurality of color components constituting the first calorimetric system.

Also, it is preferred that the plurality of sets of color information that are selected include color information corresponding to all the color components constituting the first calorimetric system present at, at least, one pixel corresponding to each of the color components.

Another calorimetric system conversion method according to the present invention for converting a first image having a plurality of pixels and expressed in a first calorimetric system constituted of a plurality of color components with each of the pixels corresponding to one of the color components to a second image presented in a second calorimetric system constituted of a plurality of color components which are different from the first calorimetric system, comprises: assigning a positive weighting coefficient to color information present in a central area containing a processing object pixel and at least one pixel adjacent to the processing object pixel in the first image; assigning a negative weighting coefficient to color information present in an area containing at least one pixel adjacent to the central area; and generating color information representing at least one of the color components constituting the second calorimetric system for a pixel in the second image corresponding to the processing object pixel through a weighted addition of the plurality of sets of color information.

In this calorimetric system conversion method, it is preferred that the color information in the central area includes color information corresponding to all the color components constituting the first calorimetric system present at, at least, one pixel corresponding to each of the color components.

A computer-readable computer program product according to the present invention contains a calorimetric system conversion program for converting a first image having a plurality of pixels and expressed in a first calorimetric system constituted of a plurality of color components with each of the pixels corresponding to one of the color components to a second image represented in a second calorimetric system constituted of a plurality of color components which are different from the first calorimetric system, and the calorimetric system conversion program comprises: an instruction code for determining levels of similarity manifesting at a processing object pixel along a plurality of directions in the first image; and an instruction code for generating color information representing at least one of the color components constituting the second calorimetric system for a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity.

In this computer program product, it is preferred that the plurality of sets of color information that are selected include color information corresponding to all the color components constituting the first calorimetric system present at, at least, one pixel corresponding to each of the color components.

Another computer-readable computer program product contains a calorimetric system conversion program for converting a first image having a plurality of pixels and expressed in a first colorimetric system constituted of color components with each of the pixels corresponding to one of the color components to a second image represented in a second calorimetric system constituted of a plurality of color components which are different from the first calorimetric system, and the calorimetric system conversion program comprises: an instruction code for assigning a positive weighting coefficient to color information present in a central area containing a processing object pixel and at least one pixel adjacent to the processing object pixel in the first image; an instruction code for assigning a negative weighting coefficient to color information present in an area containing at least one pixel adjacent to the central area; and an instruction code for generating color information representing at least one of the color components constituting the second colorimetric system for a pixel in the second image corresponding to the processing object pixel through a weighted addition of the plurality of sets of color information.

In this computer program product, it is preferred that the color information in the central area includes color information corresponding to all the color components constituting the first calorimetric system present at, at least, one pixel corresponding to each of the color components.

It is preferred that each of the above computer program products is a recording medium having the calorimetric system conversion program recorded therein.

It is preferred that each of the above computer program products is a carrier wave in which the control program is embodied as a data signal.

BRIEF DESCRIPTION OF THE DRAWINGS

FIG. 2 shows the arrangement of the color components in Bayer-arrayed image data;

FIG. 6 presents a flow chart (4) of the operation executed in the image processing unit in the first embodiment;

FIG. 7 presents a flow chart (5) of the operation executed in the image processing unit in the first embodiment;

FIG. 8 is provided to facilitate an explanation of the concept of the peripheral addition;

FIG. 10 presents examples of values that may be set in the coefficient tables;

FIG. 11 presents examples of the values that may be set in the coefficient tables;

FIG. 12 shows states in which the color difference Cr has been calculated;

FIG. 13 presents an example of a table that may be used when generating the Cr component;

FIG. 14 presents examples of values that may be set in the coefficient tables used in a second embodiment; and FIG. 15 presents an example of the Y=Yc+k(Yc−Ys) generation coefficient.

BEST MODE FOR CARRYING OUT THE INVENTION

First Embodiment

The following is a detailed explanation of an embodiment of the present invention, given in reference to the drawings.

It is to be noted that in the first embodiment explained below, the image processing function of the image processing apparatus according to the present invention is achieved in an electronic camera.

Figure 1:
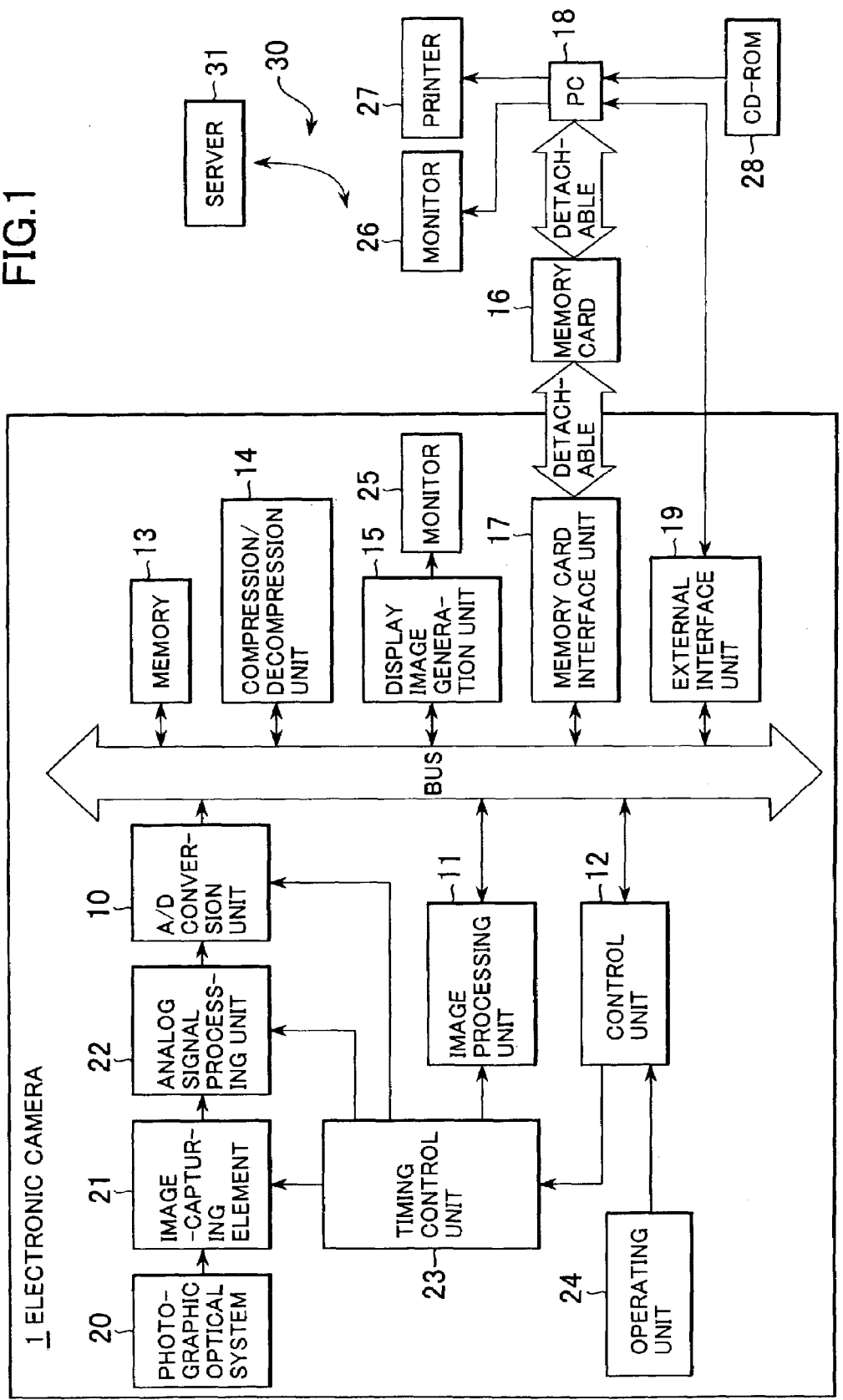
FIG. 1 is a functional block diagram of an electronic camera.

FIG. 1 is a functional block diagram of the electronic camera realized in the first embodiment.

An electronic camera 1 in FIG. 1 comprises an A/D conversion unit 10, an image processing unit (e.g., a single-chip microprocessor dedicated to image processing) 11, a control unit 12, a memory 13, a compression/decompression unit 14 and a display image generation unit 15, and it also includes a memory card interface unit 17 that achieves interface with a memory card (a card-style removable memory) 16 and an external interface unit 19 that achieves an interface with an external apparatus such as a PC (personal computer) 18 via a specific cable or a specific wireless transmission path are all connected with one another via a bus.

In addition, the electronic camera 1 includes a photographic optical system 20, an image-capturing element 21 having R, G and B color filters arranged in a Bayer array, an analog signal processing unit 22 and a timing control unit 23. An optical image obtained through the photographic optical system 20 is formed at the image-capturing element 21, an output of the image-capturing element 21 is connected to the analog signal processing unit 22, an output of the analog signal processing unit 22 is connected to the A/D conversion unit 10, an output of the control unit 12 is connected to the timing control unit 23 and an output of the timing control unit 23 is connected to the image-capturing element 21, the analog signal processing unit 22, the A/D conversion unit 10 and the image processing circuit 11.

The electronic camera 1 further includes an operating unit 24 equivalent to a shutter release button, a selector button for mode selection and the like and a monitor 25, with an output of the operating unit 24 connected to the control unit 12 and an output of the display image generation unit 15 connected to the monitor 25.

It is to be noted that a monitor 26, a printer 27 and the like are connected to the PC 18 and that an application program recorded in a CD ROM 28 is installed in advance at the PC 18. In addition, the PC 18 includes a memory card interface unit (not shown) that achieves interface with the memory card 16 and an external interface unit (not shown) that achieves interface with an external apparatus such as the electronic camera 1 via a specific cable or a specific wireless transmission path, as well as a CPU, a memory and a hard disk (not shown).

When a photographing mode is selected and the shutter release button is pressed by the operator via the operating unit 24 in the electronic camera 1 adopting the structure shown in FIG. 1, the control unit 12 implements timing control of the image-capturing element 21, the analog signal processing unit 22 and the A/D conversion unit 10 via the timing control unit 23. The image-capturing element 21 generates an image signal corresponding to the optical image, and this image signal undergoes specific signal processing at the analog signal processing unit 22, and becomes digitized at the A/D conversion unit 10 to be provided to the image processing unit 11 as image data.

It is to be noted that since the R, G and B color filters are provided in a Bayer array at the image-capturing element 21, the image data provided to the image processing unit 11 are expressed in the RGB calorimetric system and color information corresponding to one color component among the R, G and B color components is present at each pixel, in the electronic camera 1. Accordingly, such image data are hereafter referred to as "Bayer-arrayed image data".

The image processing unit 11 executes "brightness (or luminance) component generation processing" and "chromaticity component generation processing", which are part of the "calorimetric system conversion processing" to be detailed later on the Bayer-arrayed image data and thus generates image data in the YCrCb calorimetric system (image data having the Y component, the Cr component and the Cb component generated in correspondence to each of the pixels).

In addition, the image processing unit 11 executes specific image processing on the image data in the YCrCb calorimetric system generated through the calorimetric system conversion processing. For instance, it implements smoothing processing (equivalent to noise removal or the like) or edge emphasis on the Y component, and implements smoothing processing on the Cr component and the Cb component. However, if a mode for monochrome photographing (hereafter referred to as a "black-and-white mode") has been selected by the operator for the photographing mode, the image processing unit 11 only needs to execute image processing such as smoothing processing and the edge emphasis on the Y component alone and it is not necessary to implement any image processing on the Cr component or the Cb component. For this reason, if the electronic camera is currently set in the black-and-white mode, neither the Cr component nor the Cb component is generated during the "chromaticity component generation processing" in the "calorimetric system conversion processing" described later.

The image data in the YCrCb calorimetric system having undergone the image processing then undergo a specific type of compression processing at the compression/decompression unit 14 as necessary and then are recorded into the memory card 16 via the memory card interface unit 17.

It is to be noted that once the image processing on the image data in the YCrCb calorimetric system is completed, the image data may be recorded into the memory card 16 without undergoing compression processing, or they may be converted to data in the colorimetric system (e.g., the RGB colorimetric system, the YUV calorimetric system or the CMY calorimetric system) adopted at the monitor 26 and the printer 27 on the PC 18 as necessary, to be provided to the PC 18 via the external interface unit 19.

When the operator selects a reproduction mode via the operating unit 24, the image data recorded in the memory card 16 are read out via the memory card interface unit 17, then undergo decompression processing at the compression/decompression unit 14, are converted to data in the colorimetric system adopted at the monitor 25 by the image processing unit 11 and are displayed at the monitor 25 via the display image generation unit 15.

It is to be noted that the image data having undergone the decompression processing may be instead converted to data in the calorimetric system adopted at the monitor 26 and the printer 27 on the PC 18 as necessary without displaying the decompressed image data at the monitor 25, and the converted image data may be provided to the PC 18 via the external interface unit 19.

The processing for converting the image data in the YCrCb calorimetric system that are generated through the "brightness component generation processing" and the "chromaticity component generation processing" in the "colorimetric system conversion processing" to be detailed later to data in the calorimetric system adopted at the monitor 26 and the printer 27 can be achieved through the known art and, for this reason, its explanation is omitted.

FIG. 2 shows the arrangement of the color components in Bayer-arrayed image data.

It is to be noted that R, C and B in FIG. 2 indicate different color components and that the values of the coordinates [X,Y] in FIG. 2 indicate positions of the pixels, each corresponding to one of the color components.

In addition, through the "brightness component generation processing" and the "chromaticity component generation processing" in the "calorimetric system conversion processing" detailed later, the brightness component and the chromaticity components are generated for each pixel, and FIG. 2 shows the arrangement of the color components at 5×5 pixels around the processing object pixel at coordinates [i,j] undergoing the processing.

More specifically, FIG. 2 (1) shows a state in which the processing object pixel corresponds to the red color component (hereafter referred to as an "R-positioned state"), FIG. 2 (2) shows a state in which the processing object pixel corresponds to the blue color component (hereafter referred to as a "B-positioned state"), FIG. 2 (3) shows a state in which the processing object pixel corresponds to the green color component and the pixels to the right and the left of the processing target pixel correspond to the red color component (hereafter referred to as a "Gr-positioned state") and FIG. 2 (4) shows a state in which the processing object pixel corresponds to the green color component and the pixels to the left and the right of the processing target pixel correspond to the blue color component (hereafter referred to as a "Gb-positioned state").

Figure 3:
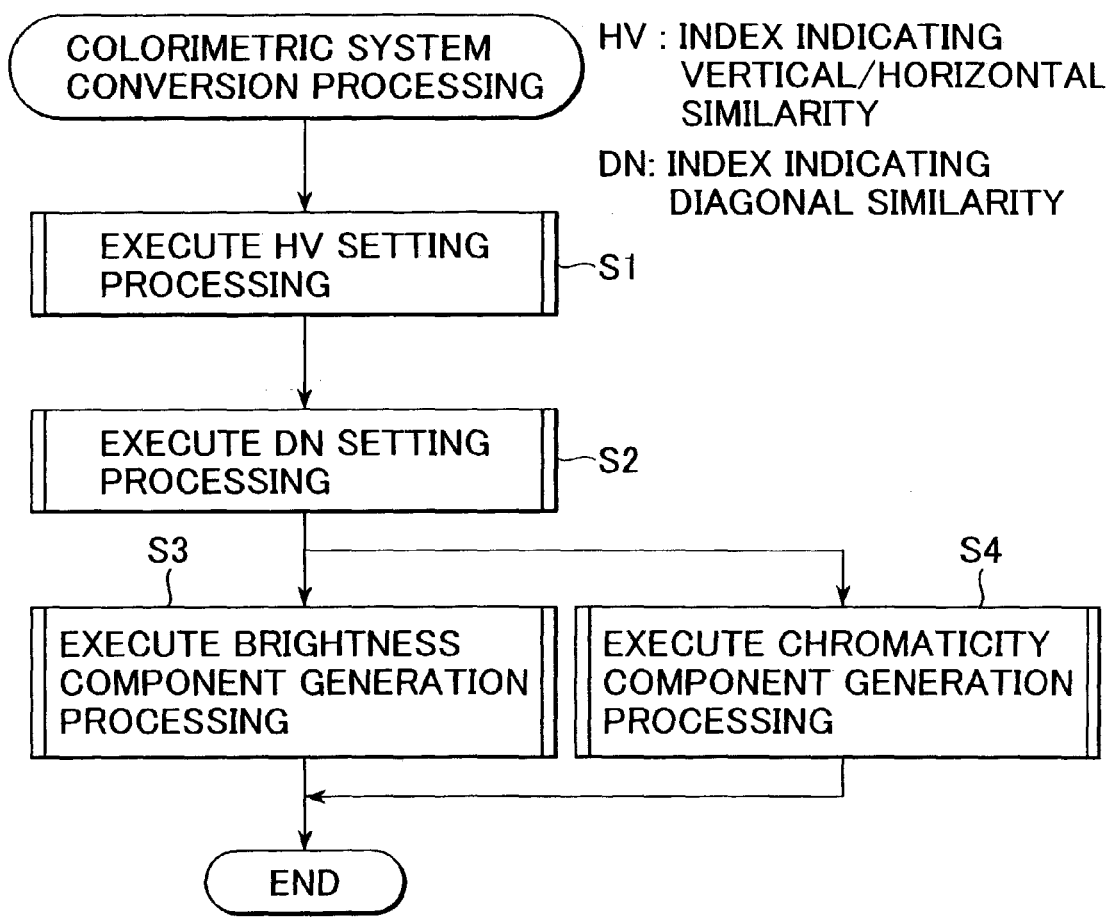
FIG. 3 presents a flow chart (1) of the operation executed in the image processing unit in a first embodiment.
Figure 4:
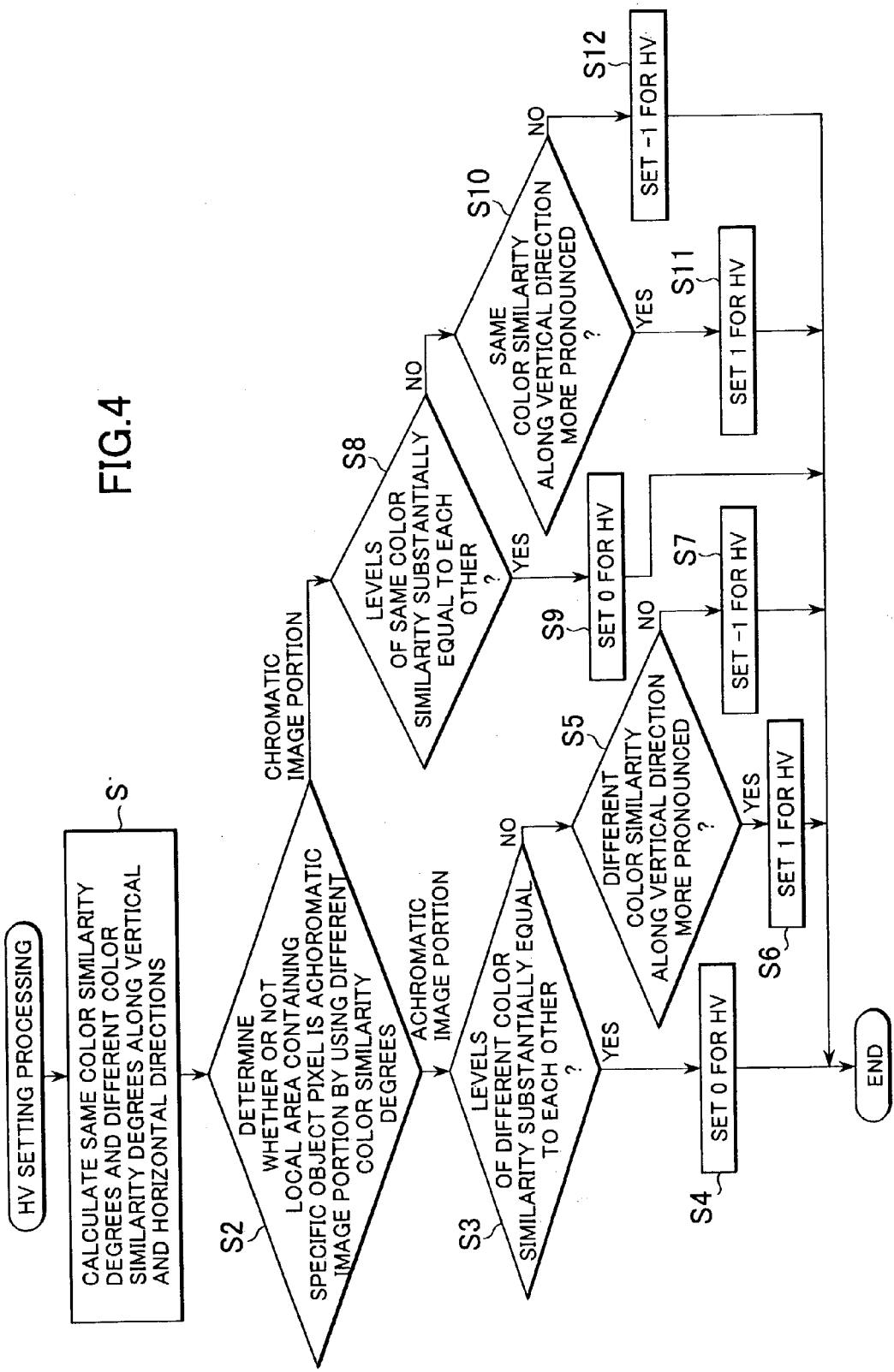
FIG. 4 presents a flow chart (2) of the operation executed in the image processing unit in the first embodiment.
Figure 5:
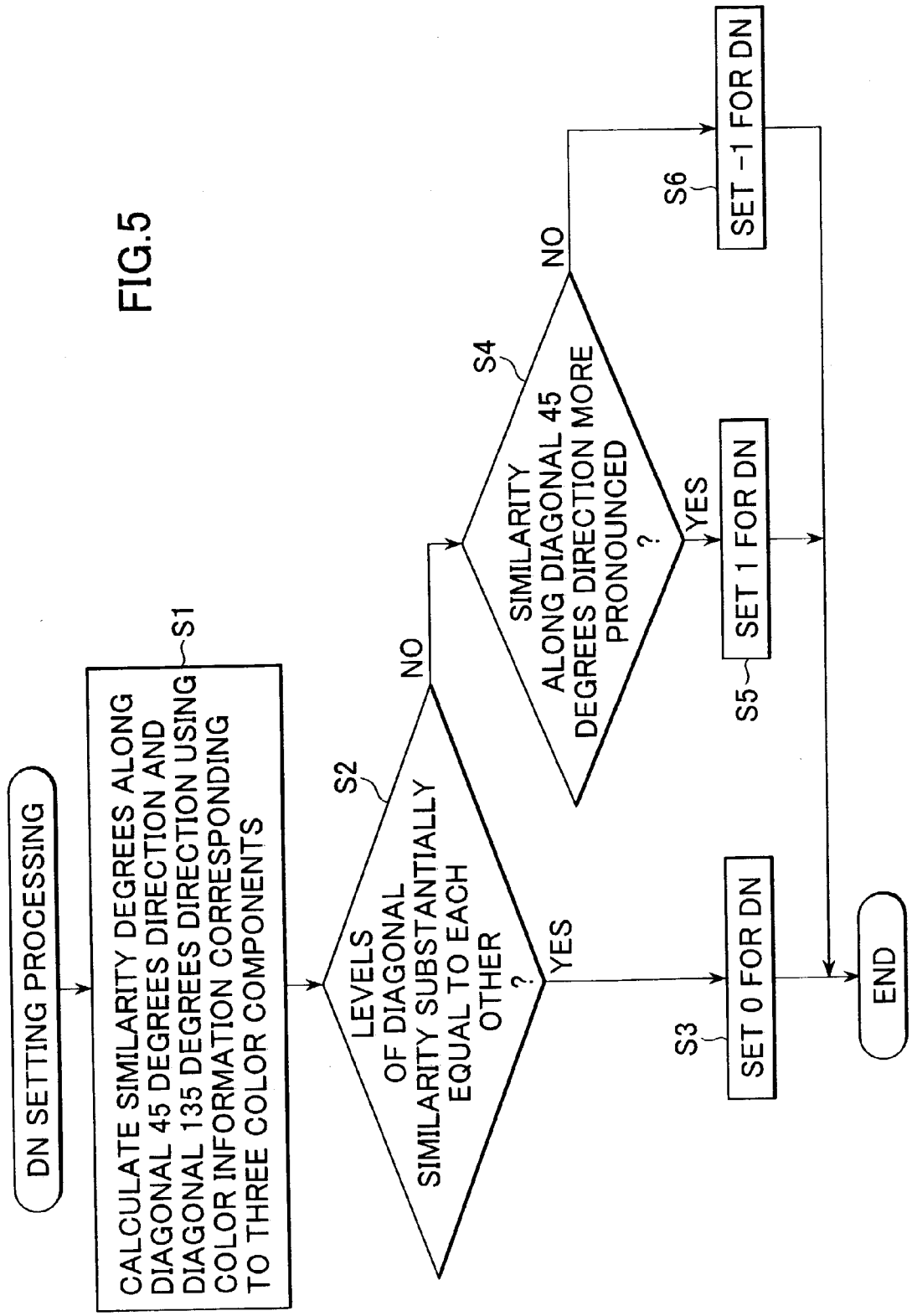
FIG. 5 presents a flow chart (3) of the operation executed in the image processing unit in the first embodiment.

FIGS. 3~7 present flow charts of the operations executed in the image processing unit 11 in the first embodiment, with FIG. 3 showing the out line of the operation executed in the "calorimetric system conversion processing" FIGS. 4 and 5 showing the operation executed in the "index HV setting processing" and the "index DN setting processing" which are part of the "calorimetric system conversion processing", FIG. 6 showing the operation executed in the "brightness component generation processing" and FIG. 7 showing the operation executed in the "chromaticity component generation processing".

The explanation of the operations executed in the first embodiment provided below focuses on the operations executed during the "calorimetric system conversion processing" (the "index HV setting processing", the "index DN setting processing", the "brightness component generation processing" and the "chromaticity component generation processing") among the image processing operations executed by the image processing unit 11 and the operations other than those listed above are not explained.

First, in reference to FIG. 3, the outline of the "colorimetric system conversion processing" operation is explained.

The image processing unit 11 executes the processing for setting an index HV that indicates the level of similarity manifesting along the vertical direction and the horizontal direction (hereafter referred to as "vertical/horizontal similarity") on the processing object pixel (FIG. 3, S1) and executes the processing for setting an index DN that indicates the level of similarity manifesting along diagonal directions (hereafter referred to as "diagonal similarity") (FIG. 3, S2).

It is to be noted that in the first embodiment, the index HV is set to 1 for a pixel manifesting more pronounced similarity along the vertical direction than along the horizontal direction, the index HV is set to −1 for a pixel manifesting a more pronounced similarity along the horizontal direction than along the vertical direction and the index HV is set to 0 for a pixel with no discernible difference between the levels of similarity along the vertical and horizontal directions. In addition, the index DN is set to 1 for a pixel manifesting a more pronounced similarity along the diagonal 45 degrees direction than along the diagonal 135 degrees direction, the index DN is set to −1 for a pixel manifesting a more pronounced similarity along the diagonal 135 degrees direction than along the diagonal 45 degrees direction and the index DN is set to 0 for a pixel with no discernible difference between the levels of similarity along the two diagonal directions. See FIG. 9 for details.

Next, the image processing unit 11 executes the "brightness component generation processing" (FIG. 3, S3) and also executes the "chromaticity component generation processing" (FIG. 3, S4).

The following is an explanation of the "index HV setting processing", the "index DN setting processing", the "brightness component generation processing" and the "chromaticity component generation processing". The "brightness component generation processing" and the "chromaticity component generation processing" are to be explained in detail following the explanation of the "index HV setting processing" and the "index DN setting processing".

(Index HV Setting Processing)

First, in reference to FIG. 4, the "index HV setting processing" is explained in detail.

It is to be noted that an example in which the index HV[i,j] for a pixel with the positional coordinates [i,j] is calculated is explained, with R, G and B in FIG. 2 replaced with Z and color information corresponding to the color component of each pixel expressed as Z[i,j] in the arithmetic expressions explained below.

First, the image processing unit 11 obtains through an arithmetic operation same color similarity degrees each calculated by using a plurality of similarity components each constituted of color information corresponding to a single color component and different color similarity degrees each calculated by using a plurality of similarity components each constituted of color information corresponding to different color components, both along the vertical direction and along the horizontal direction (FIG. 4, S1).

For instance, the image processing unit 11 may calculate values as defined in the following expressions 1~4 for the pixel at the coordinates [i,j] during the process of calculating these similarity degrees.

It is to be noted that the terms each representing the absolute value of a difference in expressions 1 and 2 are each equivalent to a similarity component constituted of color information corresponding to a single color component and that the terms each representing the absolute value of a difference in expressions 3 and 4 are each equivalent to a similarity component constituted of color information corresponding to different color components. These similarity components may be calculated as squares, higher-order powers or the like of the absolute values instead of as the absolute values of the differences.

$$CvS0[i,j]=(|Z[i,j-1]-Z[i,j+1]|+(|Z[i-1,j-1]-Z[i-1,j+1]|+|Z[i+1,j-1]-Z[i+1,j+1]|)/2)/2 \quad \text{expression 1}$$

$$ChS0[i,j]=(|Z[i-1,j]-Z[i+1,j]|+(|Z[i-1,j-1]-Z[i+1,j-1]|+|Z[i-1,j+1]-Z[i+1,j+1]|)/2)/2 \quad \text{expression 2}$$

$$CvN0[i,j]=(|Z[i,j-1]-Z[i,j]|+|Z[i,j+1]-Z[i,j]|)/2 \quad \text{expression 3}$$

$$ChN0[i,j]=(|Z[i-1,j]-Z[i,j]|+|Z[i+1,j]-Z[i,j]|)/2 \quad \text{expression 4}$$

While CvS0[i,j], ChS0[i,j], CvN0[i,j] and ChN0[i,j] calculated by using arithmetic expressions 1~4 may be directly used as the same color similarity degree along the vertical direction, the same color similarity degree along the horizontal direction, the different color similarity degree along the vertical direction and the different color similarity degree along the horizontal direction of the pixel at the coordinates [i,j], similar values are calculated for pixels near the pixel at the coordinates [i,j] in addition to the values corresponding to the pixel at the coordinates [i,j] and the same color similarity degrees and the different color similarity degrees along the vertical direction and the horizontal direction are calculated for the pixel at the coordinates [i,j] by executing weighted addition (hereafter referred to as "peripheral addition") of the various values along each direction in this example.

Namely, the image processing unit 11 calculates a same color similarity degree CvS[i,j] along the vertical direction, a same color similarity degree ChS[i,j] along the horizontal direction, a different color similarity degree CvN[i,j] along the vertical direction and a different color similarity degree ChN[i,j] along the horizontal direction by executing peripheral additions as indicated in expressions 5~8 with values calculated through expressions 1~4 for the pixels at the coordinates [i,j], [i−1,j−1], [i+1,j−1], [i−1,j+1], [i+1,j+1], [i,j−2], [i,j+2], [i−2,j] and [i+2,j].

It is to be noted that performing an arithmetic operation as indicated in expressions 5~8 is equivalent to executing peripheral additions as shown in FIG. 8.

$$CvS[i,j]=(4\cdot CvO[i,j]+2\cdot(CvO[i-1,j-1]+CvO[i+1,j-1]+CvO[i-1,j+1]+CvO[i+1,j+1])+CvO[i,j-2]+CvO[i,j+2]+CvO[i-2,j]+CvO[i+2,j])/16 \quad \text{expression 5}$$

$$ChS[i,j]=(4\cdot ChO[i,j]+2\cdot(ChO[i-1,j-1]+ChO[i+1,j-1]+ChO[i-1,j+1]+ChO[i+1,j+1])+ChO[i,j2]+ChO[i,j+2]+ChO[i-2,j]+ChO[i+2,j])/16 \quad \text{expression 6}$$

$$CvN[i,j]=(4\cdot CvN0[i,j]+2(CvN0[i-1,j-1]+CvN0[i+1,j-1]+CvN0[i-1,j+1]+CvN0[i+1,j+1])+CvN0[i,j-2]+CvN0[i,j+2]+CvN0[i-2,j]+CvN0[i+2,j])/16 \quad \text{expression 7}$$

$$ChN[i,j]=(4\cdot ChN0[i,j]+2\cdot(ChN0[i-1,j-1]+ChN0[i+1,j-1]+ChN0[i-1,j+1]+ChN0[i+1,j+1])+ChN0[i,j-2]+ChN0[i,j+2]+ChN0[i-2,j]+ChN0[i+2,j])/16 \quad \text{expression 8}$$

It is to be noted that the smaller the value of a given similarity degree calculated as explained above, the more pronounced similarity is manifested.

Since the different color similarity degrees calculated as explained above are each obtained by comparing the color information at pixels which are adjacent along the vertical direction or the horizontal direction, the levels of similarity manifesting between different colors can be determined over a shorter distance range compared to the same color similarity degrees. In other words, the different color similarity degrees are bound to reflect finer details of the image structure compared to the same color similarity degrees.

In addition, since the different color similarity degrees are calculated by assuming different sets of color information corresponding to various color components all indicate a single value of brightness, a highly reliable judgment can be made with regard to the levels of similarity based upon the different color similarity degrees over achromatic image areas. While the overall reliability of the judgment on the levels of similarity made by using the same color similarity degrees is fairly high both in chromatic image areas and in achromatic image areas, the reliability becomes poor over a finely detailed image area compared to the reliability of the judgment made by using the different color similarity degrees.

For this reason, it is highly desirable to adopt a method in which the overall image is divided into achromatic portions and chromatic portions and the levels of similarity are determined by using the similarity degrees suited for the individual portions, in order to ensure that the most reliable judgment on the levels of similarity is made for all the pixels in Bayer-arrayed image data.

Namely, a highly reliable judgment on the levels of similarity can be realized by selecting suitable similarity degrees to be used when setting the index HV, depending upon whether or not any color is present over a local image area containing a given pixel. It is to be noted that while a decision may be made as to whether or not there is any color present over the local area containing a given pixel by using local color difference information, the local color difference information as well as the levels of similarity is reflected in the different color similarity degrees calculated as explained earlier.

Accordingly, an example in which a decision is made as to whether or not any color is present over a local area containing the pixel at the coordinates [i,j] by using the different color similarity degrees and the suitable similarity degrees are selected to be used when setting the index HV based upon the results of the decision, is explained in reference to the embodiment.

First, the image processing unit 11 makes a decision as to whether or not the local area containing the pixel at the coordinates [i,j] is an achromatic image portion (FIG. 4, S2).

This decision may be made by deciding whether or not a condition 1 presented below is satisfied with regard to a threshold value ThNv or ThNh, and if condition 1 is satisfied, it can be judged that the local area containing a pixel at the coordinates [i,j] is an achromatic image portion, whereas if condition 1 is not satisfied, the local area can be judged to be a chromatic image portion.

$$CvN[i,j] \leq ThNv \text{ or } ChN[i,j] \leq ThNh \quad \text{condition 1}$$

It is to be noted that the threshold values ThNv and ThNh should assume values equal to or lower than approximately 10 when the number of graduations is 256.

Then, if the local area containing the pixel at the coordinates [i,j] is an achromatic portion, the image processing unit 11 makes a decision as to whether or not the similarity levels ascertained based upon the different color similarity degrees (hereafter referred to as "different color similarity levels") are substantially equal to each other (FIG. 4, S3).

For instance, this decision may be made by making a decision as to whether or not the following condition 2 is satisfied with regard to a threshold value Th0.

$$|CvN[i,j]-ChN[i,j]| \leq Th0 \quad \text{condition 2}$$

It is to be noted that in the expression of condition 2, the threshold value Th0 is used to ensure that when the difference between the different color similarity degree CvN[i,j]

along the vertical direction and the different color similarity degree ChN[i,j] along the horizontal direction is very small, neither of the similarity levels is erroneously judged to be higher because of noise. For this reason, the accuracy of the similarity level judgment for a color image with a great deal of noise can be improved by selecting a high value for the threshold value Th0.

If the results of the decision made in FIG. 4, S3 indicate that the different color similarity levels are roughly equal to each other (if both conditions 1 and 2 are satisfied), the image processing unit 11 judges that there is no discernible difference between the similarity levels along the vertical direction and the horizontal direction and sets 0 for the index HV[i,j] (FIG. 4, S4).

If, on the other hand, either direction is judged to manifest a higher level of different color similarity, a decision is made as to whether or not the higher level of different color similarity manifests along the vertical direction (FIG. 4, S5).

For instance, this decision may be made by making a decision as to whether or not the following condition 3 is satisfied.

$$CvN[i,j] < ChN[i,j] \qquad \text{condition 3}$$

If the results of the decision made in FIG. 4, S5 indicate that a higher level of different color similarity manifests along the vertical direction (if conditions 1 and 3 are satisfied but condition 2 is not satisfied), the image processing unit 11 judges that a more pronounced similarity manifests along the vertical direction and, accordingly sets 1 for the index HV[i,j] (FIG. 4, S6). If, on the other hand, the level of different color similarity along the vertical direction is not higher (if condition 1 is satisfied but neither condition 2 nor condition 3 is satisfied), it judges that a more pronounced similarity manifests along the horizontal direction and accordingly sets 1 for the index HV[i,j] (FIG. 4, S7).

In addition, if the results of the decision made in FIG. 4, S2 indicate that the local area containing the pixel at the coordinates [i,j] is a chromatic image portion, the image processing unit 11 makes a decision as to whether or not the levels of similarity ascertained based upon the same color similarity degrees (hereafter referred to as "same color similarity levels") are substantially equal to each other (FIG. 4, S8).

For instance, this decision may be made by determining whether or not the following condition 4 is satisfied with regard to a threshold value Th1.

$$|CvS[i,j] - ChS[i,j]| \le Th1 \qquad \text{condition 4}$$

It is to be noted that in the expression of condition 4, the threshold value Th1 is used to ensure that when the difference between the same color similarity degree CvS[i,j] along the vertical direction and the same color similarity degree ChS[i,j] along the horizontal direction is very small, neither of the similarity levels is erroneously judged to be higher because of noise. For this reason, the accuracy of the similarity level judgment for a color image with a great deal of noise can be improved by selecting a high value for the threshold value Th1.

If the results of the decision made in FIG. 4, S8 indicate that the same color similarity levels are roughly equal to each other (if condition 1 is not satisfied but condition 4 is satisfied), the image processing unit 11 judges that there is no discernible difference between the similarity levels along the vertical direction and the horizontal direction and sets 0 for the index HV[i,j] (FIG. 4, S9).

If, on the other hand, either direction is judged to manifest a higher level of same color similarity, a decision is made as to whether or not the higher level of same color similarity manifests along the vertical direction (FIG. 4, S1).

For instance, this decision may be made by making a decision as to whether or not the following condition 5 is satisfied.

$$CvS[i,j] < ChS[i,j] \qquad \text{condition 5}$$

If the results of the decision made in FIG. 4, S10 indicate that a higher level of same color similarity manifests along the vertical direction (if neither condition 1 nor 4 is satisfied but condition 5 is satisfied), the image processing unit 11 judges that a more pronounced similarity magnifies along the vertical direction and, accordingly sets 1 for the index HV[i,j] (FIG. 4, S1). If, on the other hand, the level of same color similarity along the vertical direction is not higher (if none of conditions 1, 4 and 5 is satisfied), it judges that a more pronounced similarity manifests along the horizontal direction and accordingly sets 1 for the index HV[i,j] (FIG. 4, S12).

It is to be noted that while a switch between the different color similarity degrees and the same color similarity degrees is made when judging the levels of similarity during the "index HV setting processing" described above, similarity degrees each obtained through a weighted addition of the different color similarity degree and the same color similarity degree by raising the addition ratio of the different color similarity degree in an achromatic image portion and raising the addition ratio of the same color similarity degree in a chromatic image portion may be used to judge the levels of similarity instead of making a complete switch between the different color similarity degrees and the same color similarity degrees.

In addition, while the color differences reflected in the different color similarity degrees are used to ascertain whether or not any color is present in a given local image area in the "index HV setting processing", another type of information such as color ratios may be used, instead.

(Index DN Setting Processing)

Next, in reference to FIG. 5, the "index DN setting processing" is explained in detail.

It is to be noted that an example in which the index DN[i,j] for the pixel at the coordinates [i,j] is calculated is explained, with R, G and B in FIG. 2 replaced with Z and color information corresponding to the color component of each pixel expressed as Z[i,j] in the arithmetic expressions explained below.

First, the image processing unit 11 calculates similarity degrees along the diagonal 45 degrees direction and the diagonal 135 degrees direction by using color information corresponding to the three color components (FIG. 5, S1).

For instance, the image processing unit 11 may calculate values as defined in the following expressions 9 and 10 for the pixel at the coordinates [i,j] during the process of calculating these similarity degrees.

It is to be noted that through expressions 9 and 10, the similarity degrees reflecting color information corresponding to the three color components are each calculated by using a similarity degree component constituted of color information corresponding to the green color component present along a diagonal direction, a similarity degree component constituted of color information corresponding to the blue color component (or the red color component) present along the diagonal direction and a similarity degree component constituted of color information corresponding to the blue color component and the red color component present along the diagonal direction when the coordinates [i,j] are in the R-positioned state (or in the B-positioned state). In addition, when the coordinates [i,j] assume the Gr-positioned state or the Gb-positioned state, similarity degrees reflecting color information corresponding to the three color components are each calculated by using a similarity degree component constituted of color information corresponding to the blue color component and the red color component present along the diagonal direction and a similarity degree component constituted of color information corresponding to the green color component present along the diagonal direction.

$$c45\_0[i,j]=((|z[i,j-1]-z[i-1,j]|+|z[i+1,j]-z[i,j+1]|)/2+ \\ |z[i+1,j-1]-z[i-1,j+1]|+(|z[i+1,j-1]-z[i,j]|+ \\ |z[i-1,j+1]-z[i,j]|)/2)/3 \quad \text{expression 9}$$

$$c135\_0[i,j]=((|z[i,j-1]-z[i+1,j]|+|z[i-1,j]-z[i,j+1]|)/2+ \\ (|z[i-1,j-1]-z[i+1,j+1]|+(|z[i-1,j-1]-z[i,j]|+|z[i+1, \\ j+1]-z[i,j]|)/2)/3 \quad \text{expression 10}$$

While C45_0[i,j] and C135_0[i,j] calculated by using arithmetic expressions 9 and 10 may be directly used as the similarity degrees along the diagonal 45 degrees direction and the diagonal 135 degrees direction of the pixel at the coordinates [i,j], similar values are calculated for pixels near the pixel at coordinates [i,j] in addition to the values corresponding to the pixel at the coordinates [i,j] and the similarity degrees along the two diagonal directions are calculated for the pixel at the coordinates [i,j] by executing peripheral addition of the various values along each direction in this example.

Namely, the image processing unit 11 calculates a similarity degree C45[i,j] along the diagonal 45 degrees direction and similarity degree C135[i,j] along the diagonal 135 degrees direction by executing peripheral additions as indicated in expressions 11 and 12 with values calculated through expressions 9 and 10 for the pixels at the coordinates [i,j], [i−1,j−1], [i+1,j−1], [i−1,j+1], [i+1,j+1], [i,j−2], [i,j+2], [i−2,j] and [i+2,j].

It is to be noted that performing an arithmetic operation as indicated in expressions 11 and 12 is equivalent to executing peripheral additions as shown in FIG. 8.

$$C45[i,j]=(4 \cdot C45\_0[i,j]+2 \cdot (C45\_0[i-1,j-1]+ \\ C45\_0[i+1,j-1]+C45\_0[i-1,j+1]+C45\_0[i+1,j+1])+ \\ C45\_0[i,j-2]+C45\_0[i,j+2]+C45\_0[i-2,j]+ \\ C45\_0[i+2,j])/16 \quad \text{expression 11}$$

$$C135[i,j]=(4 \cdot C135\_0[i,j]+2 \cdot (C135\_0[i-1,j-1]+ \\ C135\_0[i+1,j-1]+C135\_0[i-1,j+1]+C135\_0[i+ \\ 1,j+1])+C135\_0[i,j-2]+C135\_0[i,j+2]+ \\ C135\_0[i-2,j]+C135\_0[i+2,j])/16 \quad \text{expression 12}$$

It is to be noted that the smaller the value of a given similarity degree calculated as explained above, the more pronounced similarity is manifested.

Once the similarity degrees along the diagonal 45 degrees direction and the diagonal 135 degrees direction are calculated as described above, the image processing unit 11 makes a decision as to whether or not the levels of diagonal similarity are substantially equal to each other based upon these similarity degrees (FIG. 5, S2).

For instance, this decision may be made by determining whether or not the following condition 5 is satisfied with regard to a threshold value Th3.

$$|c45[i,j]-c135[i,j]| \leq th3 \quad \text{condition 5}$$

It is to be noted that in the expression of condition 5, the threshold value Th3 is used to ensure that when the difference between the similarity degree C45[i,j] along the diagonal 45 degrees direction and the similarity degree C135[i,j] along the diagonal 135 degrees direction is very small, neither of the similarity levels is erroneously judged to be higher because of noise. For this reason, the accuracy of the similarity level judgment for a color image with a great deal of noise can be improved by selecting a high value for the threshold value Th3.

If the results of the decision indicate that the diagonal similarity levels are roughly equal to each other (if condition 5 is satisfied), the image processing unit 11 judges that there is no discernible difference between the similarity levels along the two diagonal directions and sets 0 for the index DN[i,j] (FIG. 5, S3).

If, on the other hand, either diagonal direction is judged to manifest a higher level of similarity, a decision is made as to whether or not the higher level of similarity magnifies along the diagonal 45 degrees direction (FIG. 5, S4).

For instance, this decision may be made by making a decision as to whether or not the following condition 6 is satisfied.

$$C45[i,j]<C135[i,j] \quad \text{condition 6}$$

If the results of the decision made in FIG. 5, S4 indicate that a higher level of similarity manifests along the diagonal 45 degrees direction (if condition 5 is not satisfied but condition 6 is satisfied), the image processing unit 11 judges that a more pronounced similarity magnifies along the diagonal 45 degrees direction and, accordingly sets 1 for the index DN[i,j] (FIG. 5, S5) If, on the other hand, the level of similarity along the diagonal 45 degrees direction is not higher (if neither condition 5 nor 6 is satisfied), it judges that a more pronounced similarity manifests along the diagonal 135 degrees direction and accordingly sets 1 for the index DN[i,j] (FIG. 5, S6).

It is to be noted that since levels of similarity manifesting along the vertical and horizontal directions and the levels of similarity manifesting along the diagonal directions with regard to a pixel in the Gr-positioned state or the Gb-positioned state often match the levels of similarity manifesting with regard to an adjacent pixel (a pixel in the R-positioned state or the B-positioned state), the index HV and the index DN may be set for a given pixel in the Gr-positioned state or in the Gb-positioned state by directly using the values of the indices set for the adjacent pixel.

For instance, the indices for a pixel in the Gr-positioned state or the Gb-positioned state may be set by directly using the values of the indices set for a pixel adjacent to the pixel in the Gr-positioned state or the Gb-positioned state along a given direction or by using values representing the averages of the levels of similarity ascertained for surrounding pixels, i.e., values each obtained by dividing the sum of the index values set for the pixels adjacent to the pixel in the Gr-positioned state or the Gb-positioned state along the vertical and horizontal directions or the diagonal directions by 2 or 4 (the value of the divisor should be selected so that the quotient is within the −1~+1 range).

When the indices for a pixel in the Gr-positioned state or the Gb-positioned state are set by using the values of indices set for adjacent pixels as described above, the "index HV setting processing" and the "index DN setting processing" only need to be executed for pixels in the R-positioned state and the B-positioned state.

(Brightness Component Generation Processing)

Next, in reference to FIG. 6, the operation executed during the "brightness component generation processing" is explained.

Once the index HV and the index DN are set as described above, the image processing unit 11 makes a decision with regard to the values of the indices and the color component corresponding to the processing object pixel (FIG. 6, S1).

In this embodiment, the decision-making process is executed by classifying the similarity condition of each processing object pixel in either the R-positioned state or the B-positioned state as one of case 1~case 9 listed below and by classifying the similarity condition of each object pixel in either the Gr-positioned state or the Gb-positioned state as one of case 10~case 12 listed below. It is to be noted that x corresponding to DN[i,j] in case 10~case 12 each represents a value which is 1, 0 or −1.

Figure 9:
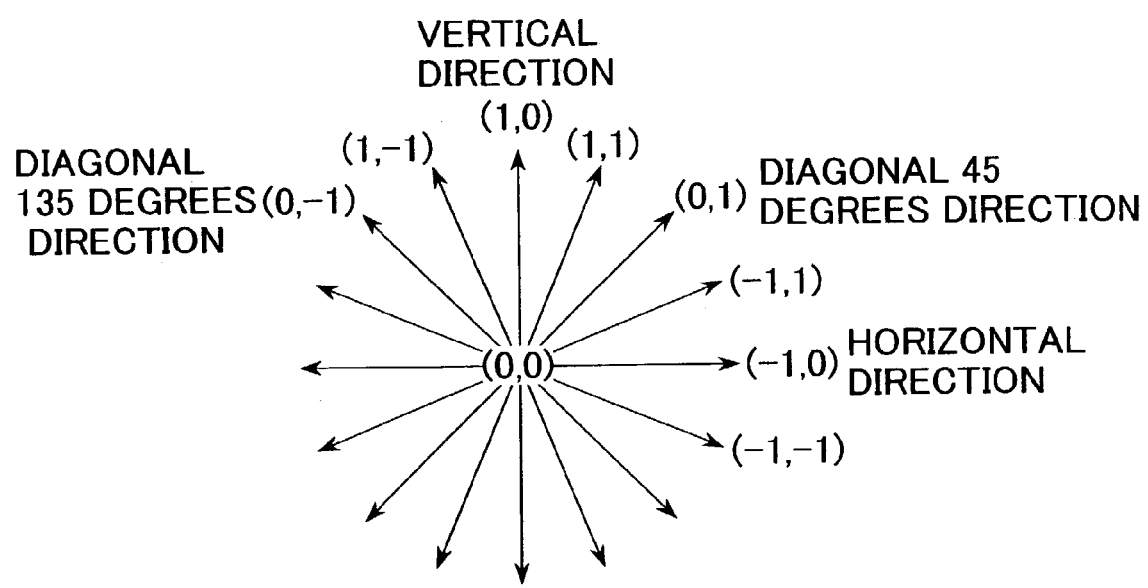
FIG. 9 shows the directions along which pronounced similarity manifests in correspondence to different values of (HV,DN)

(R-Positioned State or B-Positioned State)
case 1: (HV,DN)=(1,1): pronounced similarity along the vertical direction and the diagonal 45 degrees direction
case 2: (HV,DN)=(1,0): pronounced similarity along the vertical direction
case 3: (HV,DN)=(1,−1): pronounced similarity along the vertical direction and the diagonal 135 degrees direction
case 4: (HV,DN)=(0,1): pronounced similarity along the diagonal 45 degrees direction
case 5: (HV,DN)=(0,0): pronounced similarity along all directions (or little similarity along all directions)
case 6: (HV,DN)=(0,−1): pronounced similarity along the diagonal 135 degrees direction
case 7: (HV,DN)=(−1,1): pronounced similarity along the horizontal direction and the diagonal 45 degrees direction
case 8: (HV,DN)=(−1,0): pronounced similarity along the horizontal direction
case 9: (HV,DN)=(−1,−1): pronounced similarity along the horizontal direction and the diagonal 135 degrees direction (Gr-Positioned State or Gb-Positioned State)
case 10: (HV,DN)=(1,x): pronounced similarity at least along the vertical direction
case 11: (HV,DN)=(0,x): pronounced similarity at least along the vertical direction and the horizontal direction (or little similarity along the vertical direction and the horizontal direction)
case 12: (HV,DN)=(−1,x): pronounced similarity at least along the horizontal direction It is to be noted that FIG. 9 shows directions along which pronounced similarity manifests, each corresponding to a specific combination of the values assumed for (HV,DN).

Next, based upon the results of the decision made in FIG. 6, S1, the image processing unit 11 selects a plurality of sets of color information to be used to generate the Y component for the processing object pixel from the sets of color information corresponding to the 5×5 pixels around the processing object pixel and generates the Y component for the processing object pixel through a weighted addition of the selected sets of color information.

For instance, the processing for generating the Y component Y[i,j] for the processing object pixel at the coordinates [i,j] can be achieved by performing an arithmetic operation as indicated in expression 20 below, when R, G and B in FIG. 2 are replaced with Z, Z[X,Y] represents color information corresponding to the color component at a given pixel among the 5×5 pixels and k[X,Y] represents the weighting coefficient corresponding to a given pixel among the 5×5 pixels. However, it is assumed that specific values are set for the individual weighting coefficients in expression 20 based upon the results of the decision made in FIG. 6, S1 and that 0 is set for the weighting coefficient for any color information that is not used for the generation of the Y component.

$$Y[i,j]=K[i-2,j-2]\cdot Z[i-2,j-2]+K[i-1,j-2]\cdot Z[i-1,j-2]+\ldots+K[i+1,j+2]\cdot Z[i+1,j+2]+K[i+2,j+2]\cdot Z[i+2,j+2]$$ expression 20

Accordingly, a plurality of tables (hereafter referred to as "coefficient tables") that indicate arrays of values to be set for the weighting coefficients in expression 20 are stored in advance in the memory 13, each table in correspondence to one of case 1~case 12 explained earlier. Then, when generating the Y component for the processing object pixel through the arithmetic operation in expression 20, the image processing unit 11 selects the coefficient table corresponding to the results of the decision made in FIG. 6, S1 and proceeds to execute the processing by using the selected coefficient table. It is to be noted that a value other than 0 needs to be set for the weighting coefficient of the color information at a pixel present along a direction in which pronounced similarity manifest with regard to the processing object pixel in the coefficient table used in this processing, and that it is desirable to vary the values of the weighting coefficients for the different sets of color information at various pixels in conformance to their distances from the processing object pixel.

FIGS. 10 and 11 present examples of values set in the coefficient tables.

In FIGS. 10 and 11, each area ranging around the processing object pixel along the directions in which pronounced similarity manifests (hereafter referred to as a "central area") is shaded, and the weighting coefficients for the color information at the pixels contained in such a central area are invariably positive values whereas the weighting coefficients corresponding to the color information at pixels contained in the area adjacent to the central area include negative values. In addition, the largest value is set for the weighting coefficient corresponding to the color information at the processing object pixel and the weighting coefficient for a pixel further away from the processing object pixel is set to a smaller value.

It is to be noted that each coefficient table is set by ensuring that at least one R pixel, one G pixel and one B pixel are present among the pixels with coefficients other than 0. Namely, the coefficient tables are each set so that the Y component of the processing object pixel is obtained by using color information representing all the color components constituting the calorimetric system. In addition, they are each set so that the product obtained by multiplying the sum of all the coefficients in the coefficient table with the value indicated at the side of the table (1/16 in FIG. 10 (1)) is 1. In other words, Σki=1 is true when the coefficient ki represents the value obtained by multiplying a given coefficient in the coefficient table by the value provided at the side of the table. In addition, the coefficients in each coefficient table are set so as to achieve a predetermined RGB ratio of 1:2:1. Namely, the ratio of the value representing the sum of all the coefficients corresponding to R, the value representing the sum of all the coefficients corresponding to G and the value representing the sum of all the coefficients corresponding to B is 1:2:1. It is to be noted that each table is set by ensuring that at least one R pixel, one G pixel and one B pixel are present in the central area, as well.

When the decision-making process in FIG. 6, S1 described above is completed, the image processing unit 11 selects the coefficient table corresponding to the results of the decision in FIG. 6, S1 from the plurality of coefficient tables having specific values set therein as shown in FIGS. 10 and 11, as described below, and generates the Y component for the processing object pixel through expression 20.

case 1: the Y component is generated by using the coefficient table 1 (FIG. 6, S2)
case 2: the Y component is generated by using the coefficient table 2 (FIG. 6, S3)
case 3: the Y component is generated by using the coefficient table 3 (FIG. 6, S4)
case 4: the Y component is generated by using the coefficient table 4 (FIG. 6, S5)
case 5: the Y component is generated by using the coefficient table 5 (FIG. 6, S6)
case 6: the Y component is generated by using the coefficient table 6 (FIG. 6, S7)
case 7: the Y component is generated by using the coefficient table 7 (FIG. 6, S8)
case 8: the Y component is generated by using the coefficient table 8 (FIG. 6, S9)
case 9: the Y component is generated by using the coefficient table 9 (FIG. 6, S10)
case 10: the Y component is generated by using the coefficient table 10 (FIG. 6, S11)
case 11: the Y component is generated by using the coefficient table 11 (FIG. 6, S12)
case 12: the Y component is generated by using the coefficient table 12 (FIG. 6, S13)

(Chromaticity Component Generation Processing)

Next, in reference to FIG. 7, the operation executed in "chromaticity component generation processing" is explained.

First, the image processing unit 11 makes a decision as to whether or not the black-and-white mode has been selected by the operator via the operating unit 24 (FIG. 7, S1).

Then, if it is decided in FIG. 7, step 1 that the black-and-white mode is currently selected, the image processing unit 11 ends the chromaticity component generation processing.

If, on the other hand, it is decided in FIG. 7, S1 that the black-and-white mode has not been selected, the image processing unit 11 calculates the color differences at the pixels at which either the red color component or the blue color component is present among the processing object pixel and the pixels in the vicinity of the processing object pixel (FIG. 7, S2).

For instance, the color difference Cr at a pixel at which the red color component is present may be calculated by subtracting the Y component from the color information representing the red color component at the pixel, whereas the color difference Cb at a pixel at which the blue component is present may be calculated by subtracting the Y component from the color information representing the blue color component at the pixel.

Once the color differences are calculated, the image processing unit 11 performs a weighted addition of the color differences and generates the Cr component or the Cb component for the processing object pixel (FIG. 7, S3).

For instance, if the color differences Cr at pixels at which the red color component is present are calculated as shown in FIG. 12, the image processing unit 11 generates the Cr component of the processing object pixel by executing an arithmetic operation as indicated in one of expressions 21~24 below in correspondence to the color component corresponding to the processing object pixel. It is to be noted that the Cb component can be generated in a manner similar to that with which the Cr component is generated.

(R-Positioned State)

$$Cr[i,j]=(36 \cdot Cr[i,j]+6 \cdot (Cr[i,j-2]+Cr[i,j+2]+Cr[i-2,j]+Cr[i+2,j])+Cr[i-2,j-2]+Cr[i+2,j-2]+Cr[i-2,j+2]+Cr[i+2,j+2])/64 \qquad \text{expression 21}$$

(B-Positioned State)

$$Cr[i,j]=(Cr[i-1,j-1]+Cr[i+1,j-1]+Cr[i-1,j+1]+Cr[i+1,j+1])/4 \qquad \text{expression 22}$$

(Gr-Positioned State)

$$Cr[i,j]=(6 \cdot (Cr[i-1,j]+Cr[i+1,j])+Cr[i-1,j-2]+Cr[i+1,j-2]+Cr[i-1,j+2]+Cr[i+1,j+2])/16 \qquad \text{expression 23}$$

(Gb-Positioned State)

$$Cr[i,j]=(6 \cdot (Cr[i,j-1]+Cr[i,j+1])+Cr[i-2,j-1]+Cr[i+2,j-1]+Cr[i-2,j+1]+Cr[i+2,j+1])/16 \qquad \text{expression 24}$$

As explained above, it is not necessary to execute interpolation processing to obtain color information corresponding to all three color components R, G and B for each pixel when generating the Y component, the Cr component and the Cb component during the "brightness component generation processing" and the "chromaticity component generation processing".

As a result, better efficiency is achieved in the calorimetric system conversion processing in the first embodiment compared to the efficiency of an electronic camera in the related art in which interpolation processing is executed.

In addition, since the "brightness component generation processing" is executed by selecting the suitable coefficient table in conformance to the results of the "index HV setting processing" and the "index DN setting processing" and the color component corresponding to the processing object pixel, the Y component can be generated through a weighted addition of the color information at pixels present in the directions along which pronounced similarity manifests.

Furthermore, the "brightness component generation processing" is executed by using positive values set for the weighting coefficients corresponding to the color information at the pixels contained in the central area and negative values set for some of the weighting coefficients corresponding to the color information at pixels in the area adjacent to the central area and thus, a Y component which faithfully reflects the difference between the color information in the central area and the color information in the area adjacent to the central area can be generated.

As a result, the high-frequency component in the Bayer-arrayed image data does not become lost through the calorimetric system conversion processing and thus, the resolution can be improved with a higher degree of reliability by adopting the first embodiment compared with an electronic camera in the related art in which the Y component is generated by simply adding together sets of color information at pixels in the vicinity of the processing object pixel.

In short, the first embodiment enables efficient calorimetric system conversion processing while improving the resolution.

When the black-and-white mode is selected, the image processing such as the smoothing processing and the edge emphasis needs to be executed only on the Y component and it is not necessary to execute the image processing on the Cr component or the Cb component. In contrast, in an electronic camera in the related art, in which interpolation processing must be executed, the Y component can be generated only after executing the interpolation processing on all the color components in the calorimetric system adopted at the image-capturing element and, for this reason, it is not possible to generate the Y component alone even if the camera is set in the black-and-white mode. However, when the Bayer-arrayed image data to undergo the calorimetric system conversion processing are generated in the black and white mode, only the Y component is generated and the Cr component or the Cb component is not generated in the first embodiment.

In other words, in the first embodiment, the calorimetric system conversion processing can be executed with a high degree of efficiency without having to execute unnecessary processing (the processing for generating the Cr component and the Cb component) if the camera is set in the black-and-white mode.

It is to be noted that while the similarity condition is classified as one of case 1~case 9 based upon the values of the indices HV and DN if the processing object pixel is either in the R-positioned state or in the B-positioned state during the "brightness component generation processing" achieved in the first embodiment, the similarity condition does not need to be classified as one of case 1~case 9 and instead it may be classified as one of case A case C described below based upon the value set for the index HV alone.

Case A: HV=1: pronounced similarity along the vertical direction

Case B: HV=0: pronounced similarity along the vertical direction and the horizontal direction (or little similarity along the vertical direction and the horizontal direction)

Case C: HV=−1: pronounced similarity along the horizontal direction

It is to be noted that when the similarity condition at the processing object pixel is classified as one of case A~case C described above, the coefficient table is selected as indicated below to generate the Y component.

case A: coefficient table 2
case B: coefficient table 5
case C: coefficient table 8

In addition, while a common coefficient table is used to generate the Y component regardless of whether the processing object pixel is in the R-positioned state or in the B-positioned state (or regardless of whether the processing object pixel is in the Gr-positioned state or in the Gb-positioned state) as long as a pronounced similarity manifests along the same directions during the "brightness component generation processing" in the first embodiment, a wider selection of coefficient tables may be provided to allow the Y component to be generated by using different coefficient table each in correspondence to a given color position state at the processing object pixel.

Furthermore, while the values in FIGS. 10 and 11 are indicated in the explanation of the "brightness component generation processing" in the first embodiment as an example of values that may be set in the coefficient tables, any values may be set in the coefficient tables as long as positive values are assigned as the weighting coefficients in the central area and the values assigned as the weighting coefficients in the area adjacent to the central area include negative values.

The values that are set in the coefficient tables may be determined, for instance, by setting various values when executing "test brightness conversion processing" and extracting optimal values.

While the "brightness component generation processing" achieved in the first embodiment is equivalent to processing in which a decision is made as to which directions the processing object pixel manifests pronounced similarity and the weighting coefficients used for the Y component generation are determined in conformance to the results of the decision, such processing may also be adopted in conjunction with image data constituted of, for instance, the color components in the complementary color system as well as in conjunction with Bayer-arrayed image data generated in the RGB calorimetric system.

In addition, while the color component corresponding to the processing object pixel is determined after the "index HV setting processing" and the "index DN setting processing" in the "brightness component generation processing" in the first embodiment, the "index HV setting processing" and the "index DN setting processing" may instead be executed after determining the color component corresponding to the processing object pixel.

Since the similarity condition is classified as one of case 10~case 12 regardless of the value set for the index DN if the processing object pixel is either in the Gr-positioned state or the Gb-positioned state in the "brightness component generation processing" in the first embodiment, only the "index HV setting processing" may be executed and the "index DN setting processing" may be skipped for pixels in the Gr-positioned state and the Gb-positioned state.

Furthermore, while the similarity condition at the processing object pixel is determined based upon the index values set through the "index HV setting processing" and the "index DN setting processing" described earlier in the "brightness component generation processing" in the first embodiment, the similarity condition may be determined through any other method.

For instance, the levels of similarity manifesting along the vertical direction and the horizontal direction at the processing object pixel may be ascertained by calculating the absolute value of the difference between the color information corresponding to the green color component present above the processing object pixel and the color information corresponding to the green color component present below the processing object pixel, calculating the absolute value of the difference between the color information corresponding to the green color component present to the left of the processing object pixel and the color information corresponding to the green color component present to the right of the processing object pixel and comparing these absolute values of the differences.

The Y component generated through the "brightness component generation processing" achieved in the first embodiment can be regarded to be constituted of the Y component in the central area and the Y component in the area surrounding the central area in FIGS. 10 and 11. However, since an improvement in the resolution is achieved through the "brightness component generation processing" in the first embodiment by reflecting in the Y component the difference between the color information present in the central area and the color information present in the area surrounding the central area, Y[i,j] can be regarded as being generated through an arithmetic operation in expression 25 presented below, with Yc[i,j] representing the Y component in the central area and Ys[i,j] representing the Y component in the area surrounding the central area.

$$Y[i,j]=Yc[i,j]+K(Yc[i,j]-Ys[i,j]) \qquad \text{expression 25}$$

Under normal circumstances, the Y component can be generated through a weighted addition of the three color components R, G and B, and thus, with Rc, Gc and Bc representing the average values of the individual color components in the central area and Rs, Gs and Bs representing the average values of the individual color components in the area surrounding the central area, the Y component Yc[i,j] in the central area and the Y component Ys[i,j] in the area surrounding the central area can be generated by executing arithmetic operations as indicated in expressions 26 and 27 below. In expressions 26 and 27, cr, cg and Cb each represent a real-number coefficient used to convert the RGB calorimetric system to the YCrCb calorimetric system and (1,1,1), (1,2,1), (3,6,1), (1,4,1) or the like may be set for (cr,cg,cb).

$$Yc[i,j]=cr\cdot Rc+cg\cdot Gc+cb\cdot Bc \qquad \text{expression 26}$$

$$Ys[i,j]=cr\cdot Rs+cg\cdot Gs+cb\cdot Bs \qquad \text{expression 27}$$

By incorporating expressions 26 and 27 above in expression 25, expression 25 can be rewritten as expression 25' below.

$$Y[i,j]=cr\cdot(Rc+kr\cdot(Rc-Rs))+cg\cdot(Gc+kg\cdot(Gc-Gs))+cb\cdot(Bc+kb\cdot(Bc-Bs)) \qquad \text{expression 25'}$$

In expression 25', kr, kg and kb do not all need to assume positive values, and they may assume any value (including 0) as long as at least one of them is a positive value. In other words, at least one of the coefficients of Rs, Gs and Bs needs to be a negative value.

In addition, Rc, Gc and Bc can be calculated by using the color information at the pixels contained in the central area, Rs, Gs and Bs can be calculated by using the color information at the pixels in the area surrounding the central area, and their values vary depending upon the level of similarity manifesting at the processing object pixel and the color component corresponding to the processing object pixel.

It is to be noted that by incorporating the arithmetic expressions used to calculate Rc, Gc and Bc, Rs, Gs and Bs in expression 25', expression 25' can be expanded into an arithmetic expression (equivalent to expression 20) for calculating the Y component Y[i,j] for the pixel at the coordinates [i,j] through a weighted addition of the color information at the pixels contained in the central area and the color information at the pixels in the area surrounding the central area.

Namely, the processing for generating the Y component by using expression 25' in which the color information used to calculate Rc, Gc, Bc, Rs, Gs and Bs and the values of kr, kg and kb are varied in conformance to the level of similarity manifesting at the processing object pixel and the color component corresponding to the processing object pixel can be substituted by the processing during which the Y component is generated for the processing object pixel based upon expression 20 by using a coefficient table selected in correspondence to the level of similarity manifesting at the processing object pixel and the color component corresponding to the processing object pixel (FIG. 6, S2~S13) in the "brightness component generation processing" in the first embodiment.

While the Cr component is generated through a weighted addition of the color differences in the local area containing the processing object pixel in the "color difference component generation processing" achieved in the first embodiment, another example of color difference component generation is explained below.

The Cr component of a processing object pixel in the R-positioned state can normally be calculated through the formula presented in expression 30 below.

$$Cr[i,j]=R[i,j]-Y[i,j] \qquad \text{expression 30}$$

In addition, when Z[i−2,j−2], Z[i−1,j−2], ..., Z[i,j], ..., Z[i+1,j+2] and Z[i+2,j+2] each represent a set of color information corresponding to the color component at one of the pixels in the 5×5-pixel local area containing the processing object pixel, R[i,j] can be expressed as in expression 31 below.

$$R[i,j]=0\cdot Z[i-2,j-2]+0\cdot Z[i-1,j-2]+ \ldots +1\cdot Z[i,j]+ \ldots +0\cdot Z[i+1,j+2]+0\cdot Z[i+2,j+2] \qquad \text{expression 31}$$

Y[i,j] in expression 20 explained earlier can be rewritten as in expression 20' below.

$$Y[i,j]=K[i-2,j-2]\cdot z[i-2,j-2]+K[i-1,j-2]\cdot Z[i-1,j-2]+ \ldots +K[i,j]\cdot Z[i,j]+ \ldots +K[i+1,j+2]\cdot Z[i+1,j+2]+K[i+2,j+2]\cdot Z[i+2,j+2] \qquad \text{expression 20'}$$

Thus, expression 30 can be rewritten as expression 32 by incorporating expression 31 and expression 20' into expression 30.

$$Cr[i,j]=(0-K[i-2,j-2])\cdot Z[i-2,j-2]+(0-K[i-1,j-2])\cdot Z[i-1,j-2]+ \ldots +(1-K[i,j])\cdot Z[i,j]+ \ldots +(0-K[i+1,j+2])\cdot Z[i+1,j+2]+(0-K[i+2,j+2])\cdot Z[i+2,j+2] \qquad \text{expression 32}$$

Namely, the Cr component of the processing object pixel can be generated through a weighted addition of the sets of color information each corresponding to the color component at one of the pixels within the local area containing the processing object pixel, without having to calculate the color differences.

In addition, the values set for the weighting coefficients in expression 32 are equivalent to values obtained by inverting the signs assigned to the individual values in the coefficient table used in the "brightness component generation processing" and by adding 1 to only the value of a coefficient corresponding to the processing object pixel. For instance, if the processing object pixel is classified as case 4 through the decision made in FIG. 6, S1, the coefficients to be used to calculate the Cr component of the processing object pixel can be obtained as shown in the table in FIG. 13, based upon the values in the coefficient table 4 in FIG. 10 (4). It is to be noted that the coefficient table in FIG. 13 is set by ensuring that the sum of the values of all the coefficients is 0. Accordingly, when a coefficient ki represents the value obtained by multiplying the value of a given coefficient by the value at the side of the table, Σki=0 is true.

Second Embodiment

As shown in FIGS. 10 and 11, the weighting coefficients corresponding to the color information at the pixels contained in the central area within the local area assume positive values and the weighting coefficients corresponding to the color information at the pixels contained in the area adjacent to the central area assume negative values in the first embodiment. Namely, the Y component generated in the first embodiment reflects the difference between the color information in the central area and the color information in the area adjacent to the central area. However, a brightness component Y can be obtained by using the positive weighting coefficients in the central area alone. This concept is explained in reference to the second embodiment.

Since the first embodiment and the second embodiment are identical except for the coefficient tables that are used, a repeated explanation of the identical aspects is omitted. FIG. 14 shows coefficient tables which correspond to those in FIGS. 10 and 11 used in the first embodiment. The classifications of similarity conditions, i.e., case 1~case 12, are the same as those in the first embodiment. Coefficient tables (1)~(9) in FIG. 14 are used respectively in correspondents to case 1 case 9, whereas the coefficient table (10) in FIG. 14 is used for case 10~case 12.

It is to be noted that if the RGB color ratio used in the addition executed to obtain the brightness component based upon the results of the directional judgment varies at different pixel positions, the quality of the brightness image becomes extremely poor. Accordingly, the values of the coefficients in each coefficient table are set so that the RGB ratio is always 1:2:1 in the embodiment. In other words, the ratio of the sum of all the coefficients corresponding to R, the sum of all the coefficients corresponding to G and the sum of all the coefficients corresponding to B is 1:2:1.

In addition, each coefficient table is set by ensuring that at least one R pixel, one G pixel and one B pixel is present among pixels with coefficients other than 0. Namely, the coefficient tables are each set so that the Y component of the processing object pixel is obtained by using color information representing all the color components constituting the calorimetric system. Furthermore, they are each set so that the product obtained by multiplying the sum of all the coefficients in the coefficient table by the value indicated at the side of the table (1/8 and FIG. 14 (1)) is 1. In other words, $\Sigma k_i=1$ is true when the coefficient $k_i$ represents the value obtained by multiplying a given coefficient in the coefficient table by the value provided at the side of the table.

While the coefficient tables (1)~(10) in FIG. 14 may be regarded as tables achieved by extracting the coefficients in the central areas in the coefficient tables used in the first embodiment shown in FIGS. 10 and 11, a certain adjustment is made on the values to ensure that the RGB ratio in the individual coefficient tables is invariably 1:2:1.

As described above, since the Y component is obtained through a weighted addition of sets of color information at pixels present along the directions in which pronounced similarity manifests, calorimetric system conversion processing is realized without narrowing the frequency band of the original image in the second embodiment as well. In addition, since the Y component is obtained for all the pixels by sustaining the RGB ratio for the addition at a constant ratio of 1:2:1, a smooth brightness image that is faithful to the original image, can be obtained without being adversely affected by any particulars of the spatial arrangement of the color filters.

While the band width of the spatial frequency is not narrowed as mentioned above, the weighted addition explained above achieves a degree of low-pass effect. As a result, the gain for the high-frequency component in the resulting brightness image is somewhat lowered. In order to make up for the reduced gain, processing for emphasizing the high-frequency component in the image may be implemented. The following is an explanation of this processing.

Processing similar to edge emphasis, expressed as $Y=Yc+k(Yc-Ys)$, is implemented on the brightness signal in the local area obtained as explained earlier. In the expression, Y represents the brightness signal having undergone the processing, Yc represents the brightness signal at the target pixel prior to the processing and Ys represents the brightness signal at a pixel adjacent to or near the object pixel prior to the processing. The coefficient k is a positive real number, and as the value of the coefficient k increases, the high-frequency component is emphasized to a greater degree. FIG. 15 presents an example of coefficients that may be used in the weighted addition during this processing. It is to be noted that instead of the coefficients shown in FIG. 15, other similar filters may be used. In addition, processing similar to unsharp mask processing, expressed as $Y=Yc+k(Yc-Yclpf)$, may be implemented instead. In this expression, Yclpf represents a brightness signal obtained by applying a low-pass filter to the brightness signal at the object pixel.

Through such processing, the brightness component having the high-frequency component gain therein corrected can be obtained. It is to be noted that by using one of the coefficient tables in FIGS. 10 and 11 in the first embodiment, the processing for obtaining the Y component and the high-frequency component correction processing explained in reference to the second embodiment are achieved with a single table. Namely, the coefficient tables used in the first embodiment shown in FIGS. 10 and 11 may be considered to represent a combination of the concepts shown in FIGS. 14 and 15 adopted in the second embodiment, which also affords a higher degree of freedom through the adjustment of the coefficient values.

Third Embodiment

The following is an explanation of the operation achieved in the third embodiment.

It is to be noted that the concept of the third embodiment is equivalent to executing image processing on the PC 18 shown in FIG. 1 by using a recording medium having an image processing program recorded therein.

It is assumed that an image processing program recorded at a recording medium such as a CD-ROM 28 (an image processing program for executing the "brightness component generation processing" and the "chromaticity component generation processing", as executed by the image processing unit 11 in the first and second embodiments) is pre-installed at the PC 18. In other words, such an image processing program is stored in the hard disk (not shown) in the PC 18 in a state which allows the image processing program to be executed by the CPU (not shown).

The operation achieved in the third embodiment is explained below in reference to FIG. 1.

After the photographing mode is selected and the shutter release button is pressed by the operator via the operating unit 24, the electronic camera 1 engages the A/D conversion unit 10 to digitize the image signals having been generated at the image-capturing element 21 and having undergone a specific type of analog signal processing at the analog signal processing unit 22 and then provides the digitized image signal as image data (equivalent to Bayer-arrayed image data) to the image processing unit 11. The image processing unit 11 implements specific types of image processing (e.g., gradation conversion, γ correction and the like) on the image data thus provided. The image data having undergone the image processing are recorded into the memory card 16 via the memory card interface unit 17.

Next, as an image data transfer instruction is issued from the PC 18 via the external interface unit 19 in a PC communication mode having been selected by the operator of via the operating unit 24, the electronic camera 1 reads out the image data (equivalent to Bayer-arrayed image data) corresponding to the instruction from the memory card 16 via the memory card interface unit 17. Then, it provides the image data thus read out to the PC 18 via the external interface unit 19.

The CPU (not shown) in the PC 18 to which the image data are provided as described above executes the image processing program mentioned earlier. It is to be noted that the image data having undergone the "brightness component generation processing" and the "chromaticity component generation processing" through execution of the image processing program may be compressed as necessary and written into a hard disk (not shown), or they may be converted to the calorimetric system adopted at the monitor 26 and the printer 27 before they are provided to the monitor 26 and the printer 27.

As explained above, by adopting the third embodiment, calorimetric system conversion processing (the "brightness component generation processing" and the "chromaticity component generation processing") similar to that achieved in the first and second embodiments can be executed on the PC 18.

It is to be noted that the CPU (not shown) in the PC 18 may instead execute the image processing program by reading out the image data from the memory card 16 in which the image data are recorded as the memory card 16 is loaded into the PC 18.

In addition, the PC 18 may access a specific homepage provided by a server 31 via the Internet 30 and download the image processing program. Namely, the image processing program may be transmitted as a data signal embodied on a carrier wave. Furthermore, such an image processing program may be executed at the server 31 or the like at a remote location connected via the Internet 30 or the like, instead of at the PC 18. Namely, the PC 18 simply needs to transfer the Bayer-arrayed image data provided from the electronic camera 1 to the server 31 or the like capable of executing the image processing program via the Internet 30 or the like to have calorimetric system conversion processing similar to that in the first and second embodiments executed on the Bayer-arrayed image data.

The image processing program (the calorimetric system conversion program), a recording medium such as a CD-ROM in which the program is recorded, a carrier wave on which the program is transmitted and the like may be each defined as a computer-readable computer program product.

The advantages of the invention explained above in reference to the embodiments are summarized as below. The pre-conversion calorimetric system is referred to as the first calorimetric system and the post-conversion calorimetric system is referred to as the second colorimetric system.

Colorimetric system conversion processing can be executed without having to obtain the color information corresponding to all the color components constituting the first calorimetric system for each pixel.

Since color information representing at least one of the color components constituting the second calorimetric system can be generated for the processing object pixel through a weighted addition of sets of color information at pixels present in a direction along which pronounced similarity manifests or sets of color information suitable for the color component corresponding to the processing object pixel, the high-frequency component in a polychromatic image does not become lost through the calorimetric system conversion processing.

Since the difference between the color information in one area and the color information in another area can be reflected in at least one of the color components constituting the second colorimetric system at the processing object pixel, the high-frequency component in a polychromatic image does not become lost through the calorimetric system conversion processing.

Through the features described above, an improvement in the resolution is achieved and, at the same time, highly efficient calorimetric conversion processing is executed.

In addition, it is possible to calculate similarity degrees suited for use in the judgment of levels of similarity and also, since the different color similarity degrees and same color similarity degrees are calculated by using numerous color components, the accuracy of the similarity degree calculation is improved.

The similarity manifesting in an image in which the color tone changes (an image in which the ratio of color information corresponding to the individual color components changes) can be judged with high accuracy.

The similarity degrees can be calculated for the processing object pixel by taking into consideration the continuity between the processing object pixel and nearby pixels along the direction in which pronounced similarity manifests. Thus, since the accuracy with which levels of similarity are judged is improved, the resolution achieved through the calorimetric conversion processing can also be further improved.

Furthermore, since the Y component is determined by setting a constant addition ratio for R, G and B for all the pixels, a smooth brightness image which is also faithful to the original image can be obtained without being adversely affected by any particulars of the spatial arrangement of the color filters.

While the coefficient tables are stored in advance in the memory 13 in the embodiments explained above, the present invention is not limited to this example. A plurality of arithmetic expressions equivalent to the coefficient tables in FIGS. 10 and 11 or FIGS. 14 and 15 may be provided in advance, instead. For instance, a plurality of arithmetic expressions obtained by setting various coefficients in expression 20 may be provided. Alternately, tables equivalent to the coefficient tables in FIGS. 10 and 11 or FIGS. 14 and 15 may be obtained by using specific computational expressions. Moreover, the coefficient tables may be provided in the hardware. For instance, an electrical signal corresponding to a given coefficient table maybe selected on a multiplexer channel or the like. Namely, tables equivalent to the coefficient tables in FIGS. 10 and 11 or FIGS. 14 and 15 may be prepared as a coefficient set.

While the coefficient tables shown in FIGS. 10, 11, 14 and 15 are used in the embodiments explained above, the contents of coefficient tables used in the present invention do not need to completely match the contents of these coefficient table. Any coefficient tables having coefficient patterns and coefficient value ratios corresponding to those in the coefficient tables and FIGS. 10, 11, 14 and 15 may be used. Even coefficient tables adopting other coefficient patterns and other coefficient values may be used. In short, any coefficient tables that allow the color component values in the post-conversion calorimetric system to be deduced with high resolution and high efficiency by directly utilizing the color component values in the pre-conversion colorimetric system may be used.

While the RGB ratio in each coefficient table is set to 1:2:1 in the embodiments described above, the present invention is not limited to this example. R, G and B may be set to another ratio, e.g., 1:1:1, 1:4:1 or 3:6:1, instead.

While an explanation is given in reference to the embodiments on an example in which the RGB colorimetric system is converted to the YCrCb calorimetric system, the present invention is not limited to this example. The present invention may also be adopted to convert another calorimetric system to the YCrCb calorimetric system. For instance, the present invention may be adopted when converting image data in the CMYG calorimetric system to the YCrCb calorimetric system. In this case, each coefficient table is set by ensuring that at least one C-pixel, one M-pixel, one Y-pixel and one G pixel corresponding to the four color components are present among the pixels with coefficients other than 0. Namely, the coefficient tables are each set so that the Y component of the processing object pixel is obtained by using color information representing all the color components constituting the calorimetric system. In addition, as in the conversion of the RGB calorimetric system, the coefficient tables are each set so that $\Sigma ki=1$ is true when the coefficient ki represents the value obtained by multiplying a given coefficient in the coefficient table by a specific value. Furthermore, the coefficients in each coefficient table are set so as to achieve a constant CMYG ratio.

The invention claimed is:

1. An image processing apparatus that converts a first image having a plurality of pixels and expressed in a first colorimetric system constituted of a plurality of color components with each of the pixels corresponding to one of the color components to a second image expressed in a second colorimetric system constituted of a plurality of color components which are different from the first colorimetric system, comprising:
    a similarity decision-making device that determines levels of similarity manifesting at a processing object pixel in the first image along a plurality of directions; and
    a new component generating device that generates color information representing at least one of the color components constituting the second colorimetric system at a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity by the similarity decision-making device.

2. An image processing apparatus according to claim 1, wherein:
    the predetermined coefficients are set so as to achieve a constant ratio of sums of coefficients each sum corresponding to one of the plurality of color components constituting the first colorimetric system.

3. An image processing apparatus according to claim 1, wherein:
    the plurality of sets of color information that are selected include color information corresponding to all the color components constituting the first colorimetric system present at, at least, one pixel corresponding to each of the color components.

4. An image processing apparatus according to claim 1, further comprising:
    a coefficient storage device that stores a plurality of coefficient sets of the predetermined coefficients corresponding to the plurality of directions in which the levels of similarity are determined.

5. An image processing apparatus according to claim 4, wherein:
    the coefficient storage device stores a plurality of types of coefficient sets each in correspondence to a specific direction along which pronounced similarity manifests at the processing object pixel and also in correspondence to a color component at the processing object pixel; and
    the new color component generating device selects a coefficient set corresponding to the results of the decision made with regard to the levels of similarity by the similarity decision-making device and the color component at the processing object pixel from the coefficient storage device.

6. An image processing apparatus according to claim 4, wherein:
    the coefficient storage device stores the coefficient sets as coefficient tables.

7. An image processing apparatus according to claim 4, wherein:
    the coefficient storage device stores the coefficient sets as computational expressions; and
    the new color component generating device executes the weighted addition with the predetermined coefficients by using a computing expression selected in conformance to the results of the decision made with regard to the levels of similarity by the similarity decision-making device.

8. An image processing apparatus according to claim 1, wherein:
    the second colorimetric system comprises a brightness component and a chromaticity component.

9. An image processing apparatus according to claim 8, wherein:
    the first colorimetric system is an RGB colorimetric system.

10. An image processing apparatus according to claim 8, wherein:
    the first colorimetric system is a CMYG colorimetric system.

11. An image processing apparatus according to claim 8, wherein:
    the first colorimetric system is a RGBY colorimetric system.

12. An image processing apparatus according to claim 1, wherein:
    the similarity decision-making device calculates similarity degrees for the processing object pixel along a plurality of directions by calculating "same color similarity degrees each incorporating a plurality of similarity components each having sets of color information corresponding to a single color component" among the plurality of color components constituting the first colorimetric system and "different color similarity degrees each incorporating a plurality of similarity degree components each constituted of sets of color information corresponding to different color components" among the plurality of color components constituting the first colorimetric system and by selecting either the same color similarity degrees or the different color similarity degrees or switching weighting ratios used when performing a weighted addition of the individual similarity degrees in conformance to characteristics of an image over a local area containing the processing object pixel, and determines the levels of similarity manifesting at the processing object pixel along the plurality of directions based upon the similarity degrees.

13. An image processing apparatus according to claim 12, wherein:
    the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

14. An image processing apparatus according to claim 1, wherein:
    the similarity decision-making device calculates similarity degrees for the processing object pixel along a plurality of directions by using color information representing all the color components constituting the first colorimetric system and determines the levels of similarity manifesting at the processing object pixel along the plurality of directions based upon the similarity degrees.

15. An image processing apparatus according to claim 14, wherein:
the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

16. An image processing apparatus that converts a first image having a plurality of pixels and expressed in a first colorimetric system constituted of a plurality of color components with each of the pixels corresponding to one of the color components to a second image expressed in a second colorimetric system constituted of a plurality of color components which are different from the first colorimetric system, comprising:
a new component generating device that generates color information representing at least one of the color components constituting the second colorimetric system for a pixel in the second image corresponding to a processing object pixel in the first image by assigning a positive weighting coefficient to color information present in a central area containing the processing object pixel and at least one pixel adjacent to the processing object pixel in the first image, assigning a negative weighting coefficient to color information present in an area containing at least one pixel adjacent to the central area and executing a weighted addition of the plurality of sets of color information.

17. An image processing apparatus according to claim 16, further comprising:
a similarity decision-making device that determines levels of similarity manifesting at the processing object pixel along a plurality of directions, wherein:
the new component generating device selects an area ranging along a direction in which pronounced similarity manifests around the processing object pixel as the central area, based upon results of a decision made with regard to the levels of similarity by the similarity decision-making device.

18. An image processing apparatus according to claim 17, wherein:
the weighting coefficients corresponding to the plurality of directions along which the levels of similarity are determined correspond to each of coefficient patterns and coefficient value ratios shown in FIGS. 10 and 11.

19. An image processing apparatus according to claim 17, wherein:
the similarity decision-making device calculates similarity degrees for the processing object pixel along a plurality of directions by calculating "same color similarity degrees each incorporating a plurality of similarity components each having sets of color information corresponding to a single color component" among the plurality of color components constituting the first colorimetric system and "different color similarity degrees each incorporating a plurality of similarity degree components each constituted of sets of color information corresponding to different color components" among the plurality of color components constituting the first colorimetric system and by selecting either the same color similarity degrees or the different color similarity degrees or switching weighting ratios used when performing a weighted addition of the individual similarity degrees in conformance to characteristics of an image over a local area containing the processing object pixel, and determines the levels of similarity manifesting at the processing object pixel along the plurality of directions based upon the similarity degrees.

20. An image processing apparatus according to claim 19, wherein:
the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

21. An image processing apparatus according to claim 17, wherein:
the similarity decision-making device calculates similarity degrees for the processing object pixel along a plurality of directions by using color information representing all the color components constituting the first colorimetric system and determines the levels of similarity manifesting at the processing object pixel along the plurality of directions based upon the similarity degrees.

22. An image processing apparatus according to claim 21, wherein:
the similarity decision-making device obtains the similarity degrees for the processing object pixel along the plurality of directions by incorporating similarity degrees calculated for a pixel near the processing object pixel along the plurality of directions to similarity degrees calculated for the processing object pixel.

23. An image processing apparatus according to claim 16, further comprising:
a similarity decision-making device that determines levels of similarity manifesting at the processing object pixel along a plurality of directions, wherein:
the new component generating device varies a value set for the weighting coefficient for the color information present in the central area in conformance to results of a decision made with regard to the levels of similarity by the similarity decision-making device.

24. An image processing apparatus according to claim 16, wherein:
the color information in the central area includes color information corresponding to all the color components constituting the first colorimetric system present at, at least, one pixel corresponding to each of the color components.

25. An image processing apparatus according to claim 16, wherein:
the second colorimetric system comprises a brightness component and a chromaticity component.

26. An image processing apparatus according to claim 25, wherein:
the first colorimetric system is an RGB colorimetric system.

27. An image processing apparatus according to claim 25, wherein:
the first colorimetric system is a CMYG colorimetric system.

28. An image processing apparatus according to claim 25, wherein:
the first colorimetric system is a RGBY colorimetric system.

29. A colorimetric system conversion method for converting a first image having a plurality of pixels and expressed in a first colorimetric system constituted of a plurality of color components with each of the pixels corresponding to one of the color components to a second image expressed in a second colorimetric system constituted of a plurality of color components which are different from the first colorimetric system, comprising:

determining levels of similarity manifesting at a processing object pixel along a plurality of directions in the first image; and generating color information representing at least one of the color components constituting the second colorimetric system for a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity.

30. A colorimetric system conversion method according to claim 29, wherein:

the predetermined coefficients are set so as to achieve a constant ratio of sums of coefficients each sum corresponding to one of the plurality of color components constituting the first colorimetric system.

31. A colorimetric system conversion method according to claim 29, wherein:

the plurality of sets of color information that are selected include color information corresponding to all the color components constituting the first colorimetric system present at, at least, one pixel corresponding to each of the color components.

32. A colorimetric system conversion method for converting a first image having a plurality of pixels and expressed in a first colorimetric system constituted of a plurality of color components with each of the pixels corresponding to one of the color components to a second image presented in a second colorimetric system constituted of a plurality of color components which are different from the first colorimetric system, comprising:

assigning a positive weighting coefficient to color information present in a central area containing a processing object pixel and at least one pixel adjacent to the processing object pixel in the first image;

assigning a negative weighting coefficient to color information present in an area containing at least one pixel adjacent to the central area; and generating color information representing at least one of the color components constituting the second colorimetric system for a pixel in the second image corresponding to the processing object pixel through a weighted addition of the plurality of sets of color information.

33. A colorimetric system conversion method according to claim 32, wherein:

the color information in the central area includes color information corresponding to all the color components constituting the first colorimetric system present at, at least, one pixel corresponding to each of the color components.

34. A computer-readable medium storing a colorimetric system conversion program for converting a first image having a plurality of pixels and expressed in a first colorimetric system constituted of a plurality of color components with each of the pixels corresponding to one of the color components to a second image represented in a second colorimetric system constituted of a plurality of color components which are different from the first colorimetric system, the colorimetric system conversion program comprising:

instructions for determining levels of similarity manifesting at a processing object pixel along a plurality of directions in the first image; and instructions for generating color information representing at least one of the color components constituting the second colorimetric system for a pixel in the second image corresponding to the processing object pixel through a weighted addition executed by using predetermined coefficients to add together a plurality of sets of color information selected from color information present at the processing object pixel and color information present at pixels near the processing object pixel, based upon results of a decision made with regard to the levels of similarity.

35. A computer-readable medium according to claim 34, wherein:

the plurality of sets of color information that are selected include color information corresponding to all the color components constituting the first colorimetric system present at, at least, one pixel corresponding to each of the color components.

36. A computer-readable medium storing a colorimetric system conversion program for converting a first image having a plurality of pixels and expressed in a first colorimetric system constituted of color components with each of the pixels corresponding to one of the color components to a second image represented in a second colorimetric system constituted of a plurality of color components which are different from the first colorimetric system, the colorimetric system conversion program comprising:

instructions for assigning a positive weighting coefficient to color information present in a central area containing a processing object pixel and at least one pixel adjacent to the processing object pixel in the first image;

instructions for assigning a negative weighting coefficient to color information present in an area containing at least one pixel adjacent to the central area; and instructions for generating color information representing at least one of the color components constituting the second colorimetric system for a pixel in the second image corresponding to the processing object pixel through a weighted addition of the plurality of sets of color information.

37. A computer-readable medium according to claim 36, wherein:

the color information in the central area includes color information corresponding to all the color components constituting the first colorimetric system present at, at least, one pixel corresponding to each of the color components.

\* \* \* \* \*